(12) United States Patent
Suzaki

(10) Patent No.: US 12,296,615 B2
(45) Date of Patent: May 13, 2025

(54) LASER MARKING APPARATUS, MARKING METHOD, AND PRINT SETTING APPARATUS

(71) Applicant: Keyence Corporation, Osaka (JP)

(72) Inventor: Ryohei Suzaki, Osaka (JP)

(73) Assignee: KEYENCE CORPORATION, Osaka (JP)

( * ) Notice: Subject to any disclaimer, the term of this patent is extended or adjusted under 35 U.S.C. 154(b) by 391 days.

(21) Appl. No.: 17/980,576

(22) Filed: Nov. 4, 2022

(65) Prior Publication Data

US 2023/0150296 A1 May 18, 2023

(30) Foreign Application Priority Data

Nov. 17, 2021 (JP) ................................. 2021-186970

(51) Int. Cl.
| | | |
|---|---|---|
| *B44C 1/22* | (2006.01) | |
| *B41J 2/435* | (2006.01) | |
| *B41J 2/44* | (2006.01) | |
| *B41J 2/447* | (2006.01) | |
| *B41J 13/00* | (2006.01) | |
| *B23K 26/362* | (2014.01) | |
| *B23K 26/70* | (2014.01) | |

(Continued)

(52) U.S. Cl.
CPC ................. *B44C 1/228* (2013.01); *B41J 2/44* (2013.01); *B41J 2/442* (2013.01); *B41J 2/447* (2013.01); *B41J 13/0009* (2013.01); *B23K 26/362* (2013.01); *B23K 26/702* (2015.10); *B23K 2101/007* (2018.08); *B41J 2/435* (2013.01); *B41M 5/267* (2013.01)

(58) Field of Classification Search
CPC .... B44C 1/228; B41J 2/44; B41J 2/442; B41J 2/447; B41J 13/0009; B41J 2/435; B23K 26/362; B23K 26/702; B23K 2101/007; B41M 5/267
See application file for complete search history.

(56) References Cited

U.S. PATENT DOCUMENTS

| | | | | |
|---|---|---|---|---|
| 5,940,115 A | * | 8/1999 | Nakamura | ............. B41J 2/4753 347/252 |
| 2008/0023455 A1 | * | 1/2008 | Idaka | ..................... B23K 26/03 219/121.73 |

FOREIGN PATENT DOCUMENTS

| | | |
|---|---|---|
| JP | 4430385 B2 | 3/2010 |
| JP | 201446330 A | 3/2014 |

OTHER PUBLICATIONS

U.S. Appl. No. 17/980,574, filed Nov. 4, 2022 (151 pages).
U.S. Appl. No. 17/980,578, filed Nov. 4, 2022 (75 pages).
U.S. Appl. No. 17/981,501, filed Nov. 7, 2022 (105 pages).

* cited by examiner

*Primary Examiner* — Henok D Legesse
(74) *Attorney, Agent, or Firm* — Kilyk & Bowersox, P.L.L.C.

(57) ABSTRACT

Boldface printing having a sufficient line width is more easily implemented as compared with the related art. A laser marking apparatus includes a laser light output section, a laser light scanning section, a storage section, and a marking control section. The marking control section scans UV laser light along an outer scanning line farther from a center line of a line element of a character corresponding to print data for boldface than an inner scanning line prior to the inner scanning line closer to the center line for scanning lines adjacent to each other in a direction in which the line (Continued)

element of the character becomes thick among a plurality of the scanning lines forming the print data for boldface.

15 Claims, 14 Drawing Sheets

(51) Int. Cl.
*B23K 101/00* (2006.01)
*B41M 5/26* (2006.01)

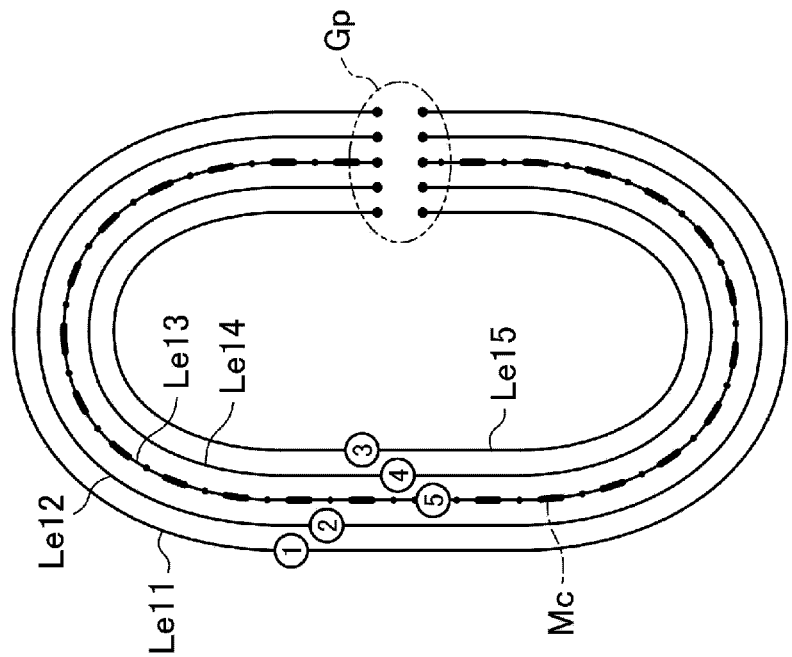
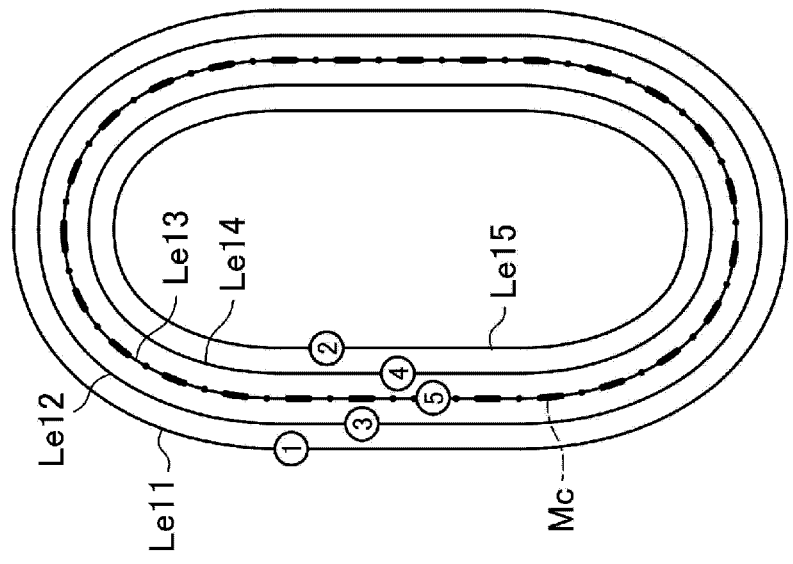

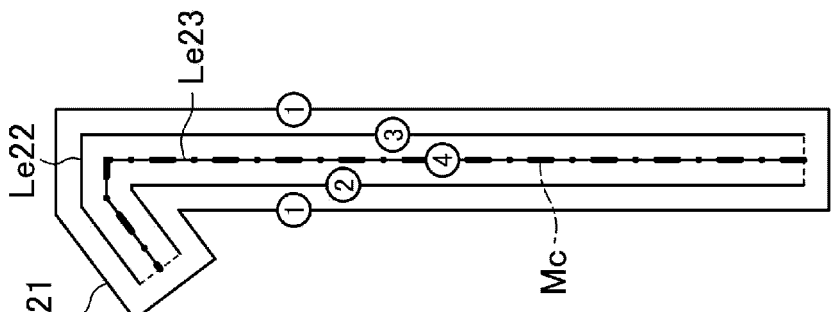
FIG. 9A  EXAMPLE 2-1
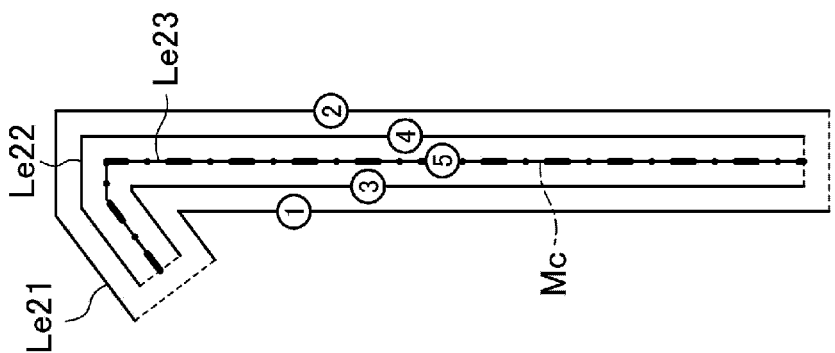
FIG. 9B  EXAMPLE 2-2
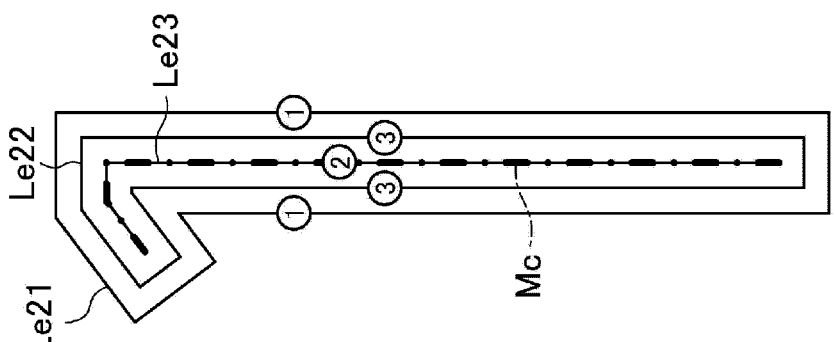
FIG. 9C  EXAMPLE 2-3
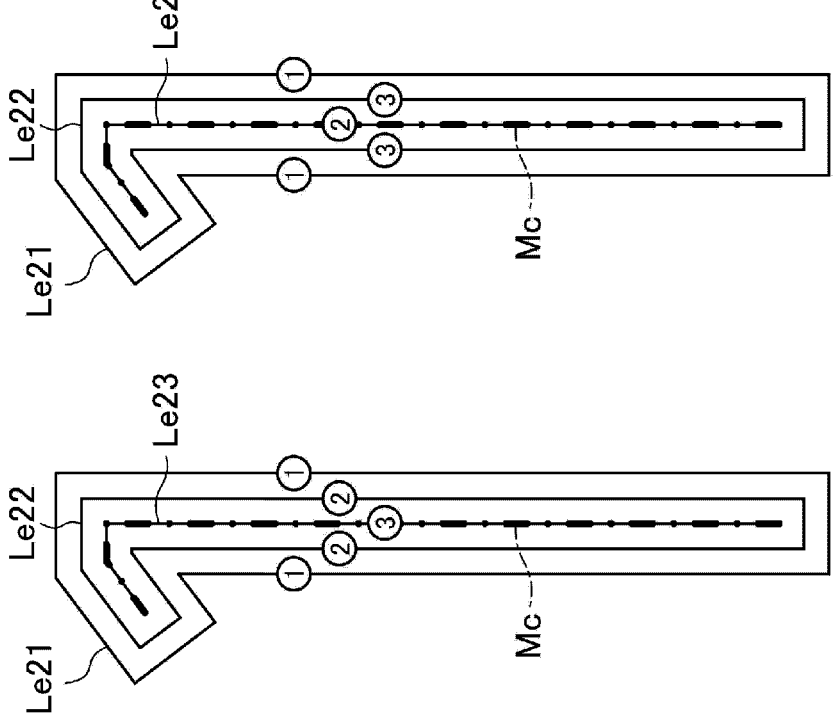
FIG. 9D  EXAMPLE 2-4

LASER MARKING APPARATUS, MARKING METHOD, AND PRINT SETTING APPARATUS

CROSS-REFERENCE TO RELATED APPLICATIONS

The present application claims foreign priority based on Japanese Patent Application No. 2021-186970, filed Nov. 17, 2021, the contents of which are incorporated herein by reference.

BACKGROUND OF THE INVENTION

1. Field of the Invention

The technology disclosed herein relates to a laser marking apparatus, a marking method, and a print setting apparatus.

2. Description of Related Art

JP 2014-046330 A discloses an example of a laser marking apparatus. Specifically, the laser marking apparatus disclosed in JP 2014-046330 A can perform wobble processing on a workpiece by spirally scanning a surface of the workpiece with a laser beam.

By using the wobble processing as disclosed in JP 2014-046330 A, so-called boldface printing in which a character to be printed is made bold can be performed on the surface of the workpiece.

In a case where the wobble processing as disclosed in JP 2014-046330 A is used, there is a possibility that print tact becomes long.

Therefore, it is conceivable to implement the boldface printing by setting a plurality of scanning lines along a center line of the character to be printed instead of using the wobble processing, In a case where the boldface printing is implemented using a plurality of scanning lines, it has conventionally been studied to form the plurality of scanning lines by first printing a scanning line that substantially coincides with the center line of the character, and then, printing the other scanning lines adjacent thereto in an order of increasing a line width from the center line or to print each of the scanning lines in order from a scanning line closer to an inner contour of the character so as to suppress accumulation of thermal energy inside a closed curve when some of the plurality of scanning lines form the closed curve.

When the former order is adopted, a scanning line farthest from the center line of the character is printed in an order after a scanning line closer to the center line. In addition, when the latter order is adopted, a scanning line farthest from the inner contour of the character is printed in an order after the other scanning lines. The scanning line farthest from the center line or the inner contour of the character corresponds to a scanning line to be printed almost last, and both of them form an outer contour of the bold character.

Here, a case will be considered in which UV laser light is adopted as laser light and the boldface printing using a plurality of scanning lines as described above is performed on a workpiece that chemically reacts with the UV laser light.

In this case, when irradiation is performed with the UV laser light along one scanning line out of the plurality of scanning lines, fumes are generated from such an irradiated portion, and a slight space is generated in the portion. Thereafter, when irradiation is performed with the UV laser light along another scanning line adjacent to the one scanning line, similar fumes are generated in such an irradiated portion, and the fumes flow into the above-described slight space. Accordingly, there is a possibility that the scanning line (the other scanning line adjacent to the one scanning line) to be printed in the subsequent order is not sufficiently printed. This is because adhesion of the fumes to a wall of the space is linked to color development of printing. In this case, the amount of the adhering fumes affects the density of printing.

Therefore, when the respective scanning lines are printed in the above-described orders, there is a possibility that a scanning line printed almost last is not sufficiently printed due to afflux of the fumes. Considering that this scanning line forms an outer contour of a character, it is difficult to implement the boldface printing having a sufficient line width in the orders that have been studied in the related art.

SUMMARY OF THE INVENTION

The technology disclosed herein has been made in view of such a point, and an object thereof is to implement boldface printing with a sufficient line width in marking a character using laser light more easily as compared with the related art.

According to one embodiment of the disclosure, provided is a laser marking apparatus including: a laser light output section that generates laser light based on excitation light and outputs the laser light; a laser light scanning section that scans a surface of a workpiece with the laser light output from the laser light output section; a storage section that stores print data for boldface including a plurality of scanning lines arranged side by side in a direction in which a line element becomes thick, the print data including the scanning lines along the line element of a character that needs to be marked; and a marking control section that controls the laser light output section and the laser light scanning section to mark a character by scanning the laser light along the scanning lines of the print data based on the print data stored in the storage section.

Further, according to the one embodiment of the disclosure, the marking control section controls the laser light scanning section to scan the laser light along an outer scanning line farther from a center line of the line element of the character corresponding to the print data for boldface than an inner scanning line prior to the inner scanning line closer to the center line of the line element of the character corresponding to the print data for boldface for the scanning lines adjacent to each other in the direction in which the line element becomes thick among the plurality of scanning lines forming the print data for boldface.

The term "scanning line" referred to herein indicates a trajectory of laser light on the surface of the workpiece. The scanning line is set to extend along one line element forming the character. As the number of the scanning lines extending along the one line element increases, the one line element can be thickened. When the plurality of line elements are thickened, the character formed by the line elements can be made bold.

According to the one embodiment of the disclosure, the marking control section determines the order of scanning each of the scanning lines with the center line of the line element of the character as a reference. Specifically, a scanning line farther from the center line is scanned first between two adjacent scanning lines. Accordingly, the scanning line forming the outer contour is scanned in an earlier order as compared with the related art so that higher quality printing can be implemented. As a result, the boldface printing with the sufficient line width can be more easily implemented as compared with the related art.

In addition, according to another embodiment of the disclosure, the laser marking apparatus may further include: a display unit that displays a setting plane defined by an orthogonal coordinate system; a character input unit that is arranged on the setting plane displayed by the display unit and receives an input of the character that needs to be marked; and a print data generation section that generates the print data for boldface including the plurality of scanning lines arranged side by side in the direction in which the line element of the character input by the character input unit becomes thick, and the storage section may store the print data for boldface generated by the print data generation section.

According to the another embodiment, the laser marking apparatus is provided with various user interfaces for generating print data for boldface. Accordingly, it is possible to achieve both usability and easy implementation of the boldface printing.

In addition, according to still another embodiment of the disclosure, the direction in which the line element becomes thick may be a direction orthogonal to the center line of the line element.

According to the still another embodiment, each of the line elements constituting the character can be appropriately thickened.

In addition, according to still another embodiment of the disclosure, the laser light output section may include: a solid-state laser crystal that generates laser light of a fundamental wave based on excitation light; and a non-linear optical crystal that generates UV laser light based on the laser light of the fundamental wave generated by the solid-state laser crystal, and the UV laser light generated by the non-linear optical crystal may be output as the laser light.

According to the still another embodiment, it is possible to easily implement the boldface printing without causing the above-described problem related to the fumes.

In addition, according to still another embodiment of the disclosure, the plurality of scanning lines forming the print data for boldface may include a scanning line forming a contour of the character, and the marking control section may control the laser light scanning section to scan the UV laser light in order from a scanning line forming an outer contour of the character among the plurality of scanning lines forming the print data for boldface.

According to the still another embodiment, the control section preferentially scans the scanning line forming the outer contour of the character. Accordingly, it is possible to print the contour of the character with high quality, which is advantageous in easily implementing the boldface printing with a sufficient line width as compared with the related art.

In addition, according to still another embodiment of the disclosure, the workpiece may be made of a sheet like multilayer film, and the multilayer film may contain at least a surface layer, a UV-reactive layer that chemically reacts with the UV laser light, and a sealant layer that sandwiches the UV-reactive layer between the surface layer and the sealant layer.

According to the still another embodiment of the disclosure, the laser marking apparatus can be configured to be suitable for printing on the film containing the UV-reactive layer.

In addition, according to still another embodiment of the disclosure, the plurality of scanning lines forming the print data for boldface may include a scanning line extending along the center line of the character.

According to the still another embodiment, the plurality of scanning lines can include the scanning line extending along the center line of the character.

In addition, according to still another embodiment of the disclosure, the marking control section may control the laser light scanning section such that a portion forming an end of the character is divided in each of the plurality of scanning lines forming the print data for boldface.

According to the still another embodiment, the marking control section divides the scanning line of the portion corresponding to the end of the character and excludes the portion from an object to be irradiated with the UV laser light. In general, the end of the character is likely to be degenerated, and thus, it is advantageous to improve the quality of boldface printing by excluding such a portion from the object to be irradiated with the UV laser light.

In addition, according to still another embodiment of the disclosure, the plurality of scanning lines forming the print data for boldface may include a closed curve, and the marking control section may control the laser light scanning section to provide a gap between a start point and an end point of the closed curve when the UV laser light is scanned along the closed curve.

According to the still another embodiment, when the plurality of scanning lines include the closed curve, the marking control section does not directly connect the start point and the end point of the closed curve, but provides the gap therebetween. Accordingly, it is advantageous in terms of suppressing the occurrence of delamination and improving the quality of the boldface printing.

In addition, according to still another embodiment of the disclosure, the laser light output section may adjust laser power of the UV laser light within a range of 0.8 W or more and 1.6 W or less.

According to still another embodiment of the disclosure, provided is a laser marking apparatus including: a laser light output section that generates laser light based on excitation light and outputs the laser light; a laser light scanning section that scans a surface of a workpiece with the laser light output from the laser light output section; a storage section that stores print data for boldface including a plurality of scanning lines arranged side by side in a direction in which a line element becomes thick, the print data including the scanning lines along the line element of a character that needs to be marked; and a marking control section that controls the laser light output section and the laser light scanning section to mark a character by scanning the laser light along the scanning lines of the print data based on the print data stored in the storage section.

Further, according to the still another embodiment of the disclosure, the marking control section controls the laser light scanning section to scan the UV laser light in an order in which a scanning line forming a contour of the character is prioritized over the other scanning lines among the plurality of scanning lines forming the print data for boldface.

Here, the term "contour of the character" is used in a broad sense. For example, in the case of a numeral "0", the contour of the character includes both an inner contour along an inner circumference of the character "0" and an outer contour along an outer circumference of the character "0". On the other hand, in the case of a numeral "1", the contour of the character includes only an "outer contour".

In addition, the expression "order in which X is prioritized" referred to herein means that X belongs to the first half when the scan order of the plurality of scanning lines is divided into the first half which is earlier, and the second half which is later. According to the still another embodiment of the disclosure, the scanning lines forming the contour of the character are scanned in an order belonging to the first half.

According to the still another embodiment of the disclosure, the marking control section determines an order of scanning the respective scanning lines with the contour of the character as a reference. Specifically, the scanning lines forming the contour of the character are preferentially scanned over the other scanning lines. Accordingly, the scanning line forming the outer contour is scanned in an earlier order as compared with the related art so that higher quality printing can be implemented. As a result, the boldface printing with the sufficient line width can be more easily implemented as compared with the related art.

In addition, according to still another embodiment of the disclosure, the marking control section may control the laser light output section such that second and subsequent intersection points are processed as invalid portions in a case where some of a plurality of scanning lines forming the print data for boldface intersects, and minute laser light is output as compared with that for a non-invalid portion when the invalid portion is scanned with the laser light by the laser light scanning section.

In addition, according to still another embodiment of the disclosure, the laser marking apparatus may include a unit that acquires movement information of the workpiece that is moving, and the marking control section may control the laser light scanning section such that the plurality of scanning lines forming the print data for boldface follow the movement of the workpiece based on a movement speed and a movement direction specified by the movement information of the workpiece.

In addition, according to one embodiment of the disclosure, provided is a marking method for marking a character on a surface of a workpiece by using a laser marking apparatus, which includes: a laser light output section that generates laser light based on excitation light and outputs the laser light; a laser light scanning section that scans the surface of the workpiece with the laser light output from the laser light output section; a storage section that stores print data for boldface including a plurality of scanning lines arranged side by side in a direction in which a line element of the character becomes thick, the print data including the scanning lines along the line element of the character that needs to be marked; and a marking control section that controls the laser light output section and the laser light scanning section to mark a character by scanning the laser light along the scanning lines of the print data based on the print data stored in the storage section.

Further, according to the one embodiment of the disclosure, the marking method includes controlling the laser light output section and the laser light scanning section by the marking control section to mark the character such that the laser light is scanned along an outer scanning line farther from a center line of the line element of the character corresponding to the print data for boldface than an inner scanning line prior to the inner scanning line closer to the center line of the line element of the character corresponding to the print data for boldface for the scanning lines adjacent to each other in the direction in which the line element becomes thick among the plurality of scanning lines forming the print data for boldface.

In addition, according to one embodiment of the disclosure, provided is a print setting apparatus that is connected to a laser marker, which includes a laser light output section generating and outputting laser light based on excitation light and a laser light scanning section scanning a surface of a workpiece with the laser light output from the laser light output section, and generates print data including a scanning line along a line element of a character that needs to be marked by the laser light scanning section.

Further, according to the one embodiment of the disclosure, the print setting apparatus includes: a display unit that displays a setting plane defined by an orthogonal coordinate system; a character input unit that is arranged on the setting plane displayed by the display unit and receives an input of the character that needs to be marked; and a print data generation section that generates print data for boldface including a plurality of the scanning lines arranged side by side in a direction in which the line element of the character input by the character input unit becomes thick; and a print data transmission section that transmits the print data for boldface generated by the print data generation section to the laser marker, and the print data generation section generates the print data for boldface for scanning lines adjacent to each other in the direction in which the line element becomes thick among the plurality of scanning lines forming the print data for boldface in an order in which an outer scanning line farther from the center line than an inner scanning line is scanned prior to the inner scanning line closer to the center line of the line element of the character corresponding to the print data for boldface.

As described above, it is possible to more easily achieve the boldface printing with the sufficient line width in marking of the character using the laser light as compared with the related art according to the disclosure.

BRIEF DESCRIPTION OF THE DRAWINGS

FIGS. 7A and 7B are diagrams illustrating a first example of the scan order;

FIG. 9A-9D are diagrams illustrating a second example of the scan order;

DETAILED DESCRIPTION OF PREFERRED EMBODIMENTS

Hereinafter, an embodiment of the disclosure will be described with reference to the drawings. Note that the following description is given as an example.

That is, print processing (hereinafter, referred to as "marking" or may be simply referred to as "processing") will be described as a representative example of marking using UV laser light in this embodiment, but the disclosure can be applied to any marking including a plurality of scanning lines, such as marking of a figure.

<Overall Configuration>

Figure 1:
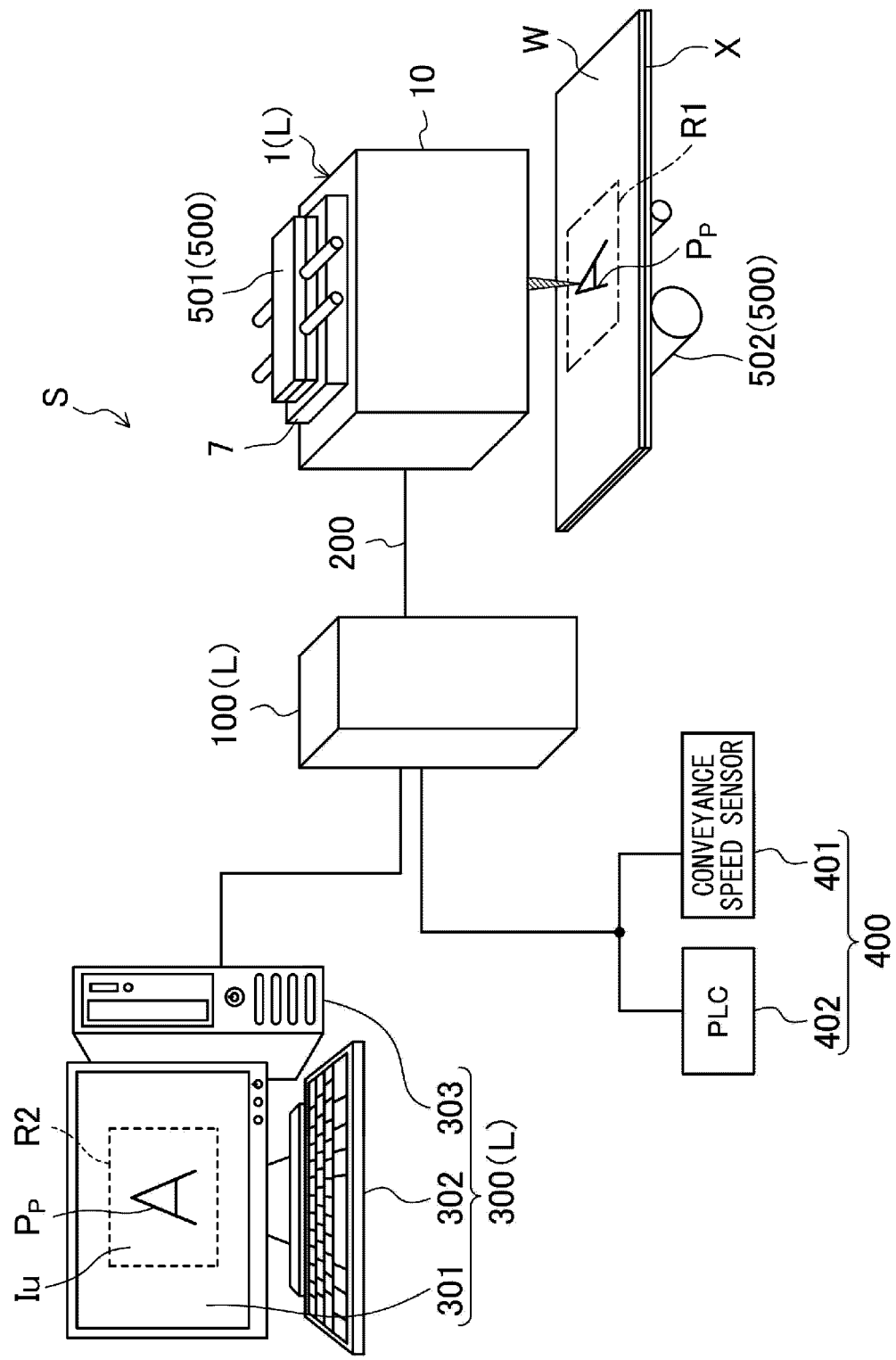
FIG. 1 is a diagram illustrating an overall configuration of a laser marking system.
Figure 2:
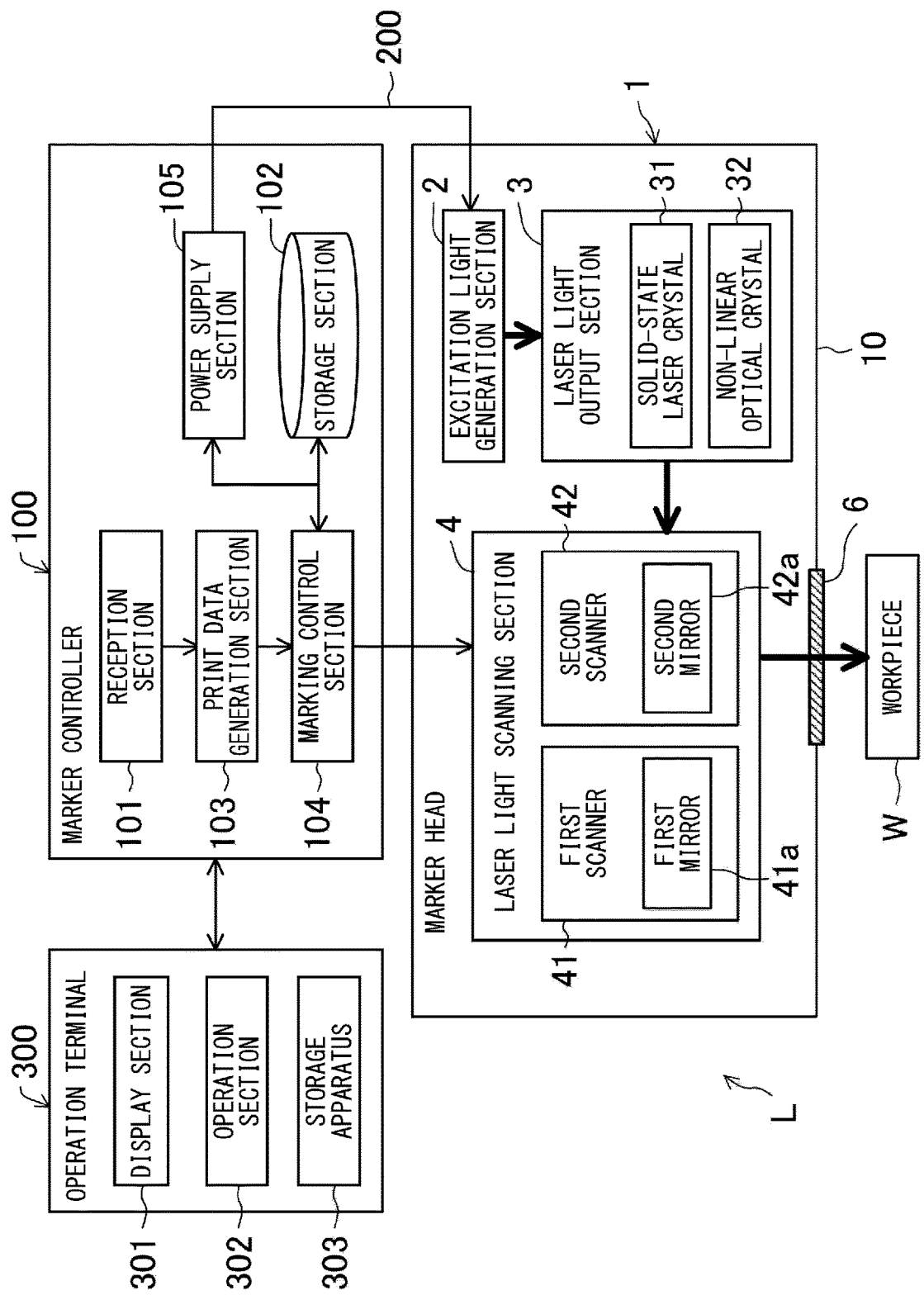
FIG. 2 is a block diagram illustrating a schematic configuration of a laser marking apparatus.

FIG. 1 is a diagram illustrating an overall configuration of a laser marking system S, and FIG. 2 is a diagram illustrating a schematic configuration of a laser marking apparatus L in the laser marking system S. In addition, FIG. 3A is a diagram for describing replacement of a printing apparatus 1001 and a marker head 1.

The laser marking system S illustrated in FIG. 1 includes the laser marking apparatus L, an external device 400 connected thereto, and a processing equipment 500 to which the laser marking apparatus L is attached and which conveys a workpiece W. Among these, the laser marking apparatus L illustrated in FIGS. 1 and 2 is configured to perform marking corresponding to a predetermined print pattern Pp on the workpiece W by irradiating a predetermined irradiation area R1 with laser light.

Note that the irradiation area R1 referred to herein is an area set on the surface of the workpiece W, and is an area corresponding to a print surface associated in advance with a setting plane R2 to be described later. The irradiation area R1 as the print surface can take various forms in accordance with a relative positional relationship between the laser marking apparatus L and the workpiece W, specifications of the laser marking apparatus L, a movement path of the workpiece W, and the like. For example, the irradiation area R1 of the workpiece W moving along a two-dimensional plane is a plane along the movement path thereof. On the other hand, the irradiation area R1 of the workpiece W moving in a three-dimensional space can be a curved surface along the movement path thereof.

In addition, the print pattern Pp in the following description includes not only a pattern of a character that needs to be marked on the workpiece W but also a pattern of a figure that need to be marked on the workpiece W, such as ":", "×", a bar code, or a QR code (registered trademark).

In particular, the laser marking apparatus L according to this embodiment can emit laser light having a wavelength near 350 nm as the laser light for processing the workpiece W. This wavelength is included in a wavelength range of ultraviolet rays. Therefore, the laser light for processing the workpiece W is sometimes referred to as "UV laser light" to be distinguished from other laser light such as near-infrared rays in the following description.

Hereinafter, a case will be described in which the workpiece W made of a sheet-like film is set as an object to be marked, and the film contains a UV-reactive layer X that chemically reacts with UV laser light.

However, the workpiece W that can be used as the object to be marked in the disclosure is not limited to the workpiece W made of the sheet-like film. The workpieces W made of various materials, such as a film including an aluminum layer, a film including an aluminum vapor deposition layer, and a film including a paper layer, as well as a plastic film may be set as the object to be marked. In addition, the workpiece W may have a three-layer structure including a surface layer, the UV-reactive layer, and a sealant layer. In the three-layer structure, the UV-reactive layer is sandwiched between the surface layer and the sealant layer. As the surface layer, for example, polybutylene terephthalate (PBT), stretched PP (OPP), or the like may be adopted. As the UV-reactive layer, for example, a layer containing titanium oxide may be adopted. As the sealant layer, for example, a polyolefin film or the like capable of hot melt adhesion may be adopted. In addition, another layer may be additionally provided to form a four-layer structure or a five-layer structure. In this case, the workpiece W is made of a sheet-like multilayer film.

In addition, the laser marking apparatus L according to this embodiment is configured to perform so-called two-dimensional printing by performing two-dimensional scanning with laser light, but so-called three-dimensional printing can also be performed since the laser marking apparatus L is configured to have a deeper depth of focus than a conventional product. Therefore, the laser marking apparatus L can mark even the workpiece W conveyed along a three-dimensional movement path.

As illustrated in FIGS. 1 and 2, the laser marking apparatus L according to this embodiment includes a marker head 1, a marker controller 100, an electric cable 200, and an operation terminal 300.

Among these, the marker controller 100 can receive a setting related to the print pattern Pp, and is configured as a controller for controlling the marker head 1.

On the other hand, the marker head 1 can irradiate the irradiation area R1 with UV laser light by being controlled by the marker controller 100.

The marker head 1 and the marker controller 100 are separated from each other in this embodiment, and are connected by the electric cable 200. The electric cable 200 includes at least an electric wiring that transmits electric power from the inside (specifically, a power supply section 105 to be described later) of the marker controller 100 to the outside. Specifically, the electric cable 200 according to this embodiment is configured by bundling the electric wiring for transmitting the electric power and a signal wiring for transmitting and receiving an analog signal, a digital signal, and the like.

Figure 3:
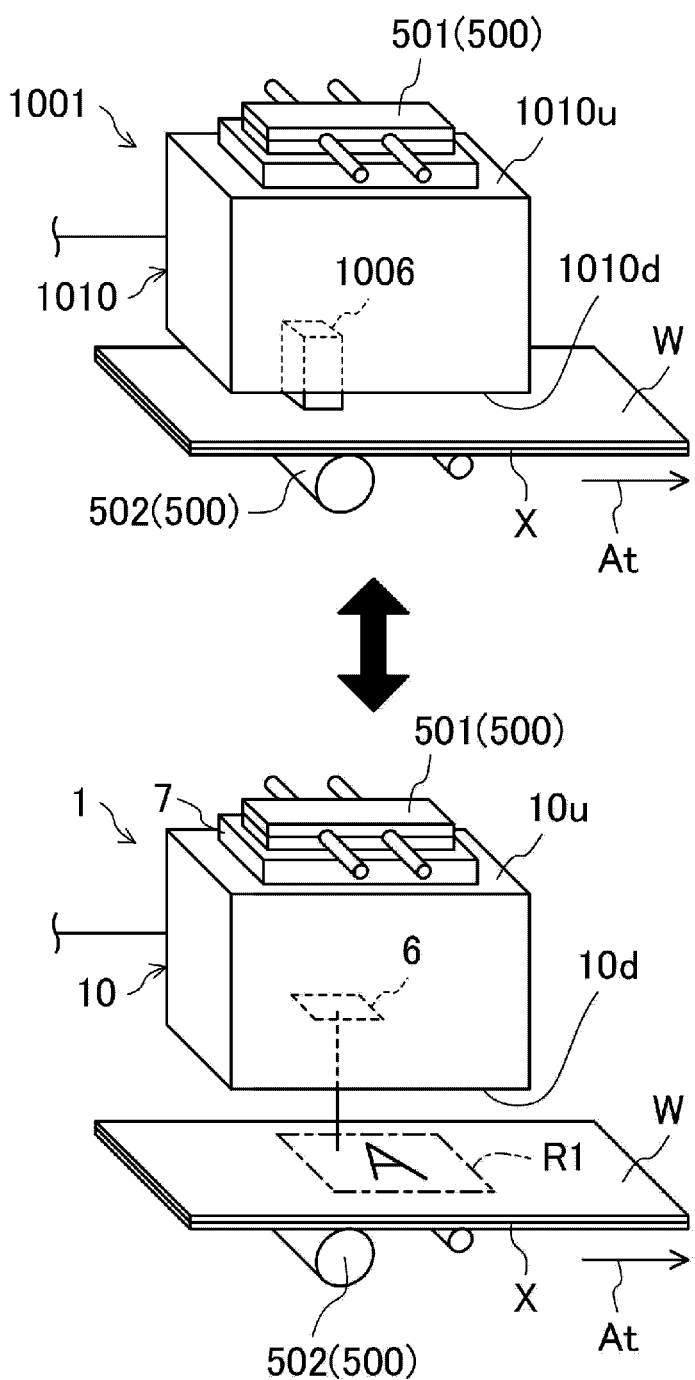
FIG. 3 is diagrams for describing replacement of a printing apparatus and a marker head.

The marker head 1 according to this embodiment is installed on the processing equipment 500 that processes the workpiece W made of a sheet-like film. As illustrated in FIG. 3, the processing equipment 500 includes a support member 501 that supports the marker head 1 and a conveyance roller 502 around which the workpiece W is placed.

Among them, the support member 501 can attach the laser marking apparatus L, particularly a housing 10 of the marker head 1, to a predetermined attachment position as illustrated in FIG. 3. Although FIGS. 1 and 3 illustrate the support member 501 configured to suspend the housing 10 from above, the housing 10 may be supported from another direction such as a side.

On the other hand, the conveyance roller 502 is formed in a cylindrical shape having a central axis extending in a lateral direction of the workpiece W. In this case, the workpiece W is conveyed in a longitudinal direction along a predetermined movement path by the rotation of the conveyance roller 502.

Here, the processing equipment 500 according to this embodiment is shared between the marker head 1 according to this embodiment and the printing apparatus 1001 that performs printing using a scheme other than the marking using laser light as illustrated in the upper diagram and the lower diagram of FIG. 3.

That is, the marker head 1 according to this embodiment can be attached to the support member 501 of the processing equipment 500, configured to attach the printing apparatus 1001, instead of the printing apparatus 1001.

Examples of the printing apparatus 1001 that can be replaced with the marker head 1 include a thermal transfer overprinter (TTO), but can also be replaced with other printing apparatuses 1001.

As the printing apparatus 1001 that can be replaced with the marker head 1, for example, any printing apparatus provided with a housing 1010 that is formed in a substantially rectangular parallelepiped shape and includes a printing surface 1010d obtained by exposing a printing section 1006 in contact with a printing area on the workpiece W, and a connection surface 1010u different from the printing surface 1010d and connectable to the support member 501.

In this case, the marker head 1 is supported by the support member 501 connectable to the connection surface 1010u similarly to the printing apparatus 1001 as illustrated in the upper diagram and the lower diagram of FIG. 3. The marker head 1 thus supported irradiates the irradiation area R1 set so as to correspond to the printing area (area in contact with the printing section 1006 in the printing apparatus 1001) with UV laser light, thereby marking the workpiece W.

On the other hand, the operation terminal 300 includes, for example, a central processing unit (CPU) and a memory, and is connected to the marker controller 100 so as to be capable of transmitting and receiving an electrical signal in a wired or wireless manner.

Note that the operation terminal 300 is configured using a personal computer such as a desktop computer or a laptop computer in this embodiment, but the disclosure is not limited to such a configuration. For example, the operation terminal 300 may be configured using a dedicated terminal that is connectable to the laser marking apparatus L such as a touch panel console. In addition, the operation terminal 300 can be also integrated into the marker controller 100, for example.

The operation terminal 300 functions as a terminal configured to set various printing conditions, such as a size of a character, and indicate information related to marking on the workpiece W to a user. The operation terminal 300 includes a display section 301 configured to display information to the user, an operation section 302 that receives an operation input from the user, and a storage apparatus 303 configured to store various types of information. Note that the operation terminal 300 may be referred to as a print setting apparatus for setting various printing conditions. In addition, the marker head 1 and the marker controller 100 may be collectively referred to as a laser marker.

The display section 301 can display the setting plane R2 defined by orthogonal coordinates. The display section 301 is an example of a "display unit" in this embodiment. In addition, an input interface Iu that receives an input of a character (hereinafter, referred to as the "print pattern Pp") that needs to be marked is arranged on the setting plane R2 displayed by the display section 301 as illustrated in FIG. 1. As will be described in detail later, the input interface Iu includes user interfaces, such as a frame indicating a range of the setting plane R2 and a figure indicating a position of the print pattern Pp on the setting plane R2, and can receive the input of the print pattern Pp based on an operation input to the operation section 302 and display a content of the received print pattern Pp on the setting plane R2. The input interface Iu is an example of a "character input unit" in this embodiment.

Specifically, the display section 301 is configured using, for example, a liquid crystal display or an organic EL panel. When the operation terminal 300 is incorporated in the marker controller 100 or the touch panel console is used, a display screen provided on the marker controller 100 or the console can be used as the display section.

The operation section 302 can be configured using a keyboard and a pointing device. Here, the pointing device includes a mouse, a joystick, or the like. When the operation terminal 300 is incorporated in the marker controller 100 or the touch panel console is used, a switch, a button, or the like provided in the marker controller 100 or the console can be used as the operation section.

The operation terminal 300 configured as described above can set printing conditions in marking based on the operation input from the user. The printing conditions include a target output (laser power) of laser light, a scanning speed (scan speed) of the laser light on the workpiece W, and the like as well as details of the print pattern Pp.

The printing conditions set by the operation terminal 300 are output to the marker controller 100 and stored in the storage section 102 of the marker controller 100. The storage apparatus 303 in the operation terminal 300 may store the printing conditions as necessary.

The external device 400 is connected to the marker controller 100 as necessary. In the example illustrated in FIGS. 1 and 2, a conveyance speed sensor 401 and a programmable logic controller (PLC) 402 are provided as the external device 400.

The conveyance speed sensor 401 is configured using, for example, a rotary encoder, and can detect a conveyance speed of the workpiece W. The conveyance speed sensor 401 outputs a signal (detection signal) indicating a detection result to the marker controller 100. The marker controller 100 controls two-dimensional scanning or the like of laser light based on the detection signal input from the conveyance speed sensor 401.

The PLC 402 is configured using, for example, a microprocessor, and can input a control signal to the marker controller 100. The PLC 402 is used to control the laser marking system S according to a predetermined sequence.

In addition to the above-described devices and apparatuses, an apparatus configured to perform operation and control, a computer configured to perform various other processes, a storage apparatus, a peripheral device, and the like can be connected to the laser marking apparatus L in a wired or wireless manner.

<Marker Head 1>

As illustrated in FIG. 2, the marker head 1 includes an excitation light generation section 2, a laser light output section 3, and a laser light scanning section 4 as main components. The excitation light generation section 2 generates excitation light for exciting UV laser light based on electric power supplied from the marker controller 100 via the electric cable 200. The laser light output section 3 generates UV laser light based on the excitation light generated by the excitation light generation section 2 and outputs the UV laser light. The laser light scanning section 4 deflects the UV laser light output from the laser light output section 3 to scan the surface of the workpiece W with the UV laser light.

In addition, the marker head 1 also includes a housing 10 that accommodates the above-described constituent elements, that is, the excitation light generation section 2, the laser light output section 3, and the laser light scanning section 4. An exit window 6 that transmits the UV laser light deflected by the laser light scanning section 4 is formed in the housing 10. Although not described in detail, the housing 10 has a substantially rectangular parallelepiped outer shape, and includes an exit surface 10d on which the exit window 6 is formed, and an attachment surface 10u different from the exit surface 10d and connectable to the support member 501. The attachment surface 10u is connected to the support member 501 via an attachment 7.

(Excitation Light Generation Section 2)

The excitation light generation section 2 is configured to receive electric power supplied from power supply section 105 through the electric cable 200, and generate excitation light corresponding to the electric power. The excitation light generation section 2 according to this embodiment includes an excitation light source (not illustrated) including, for example, a laser diode (LD). Note that the excitation light generation section 2, particularly the excitation light source, is not necessarily accommodated in the housing 10, and may be accommodated in the marker controller 100.

(Laser Light Output Section 3)

The laser light output section 3 includes a solid-state laser crystal 31 that generates a fundamental wave (fundamental wave laser light) based on excitation light, and a non-linear optical crystal 32 that generates UV laser light based on the fundamental wave (fundamental wave laser light) generated by the solid-state laser crystal 31. The laser light output section 3 outputs UV laser light generated by the non-linear optical crystal 32 as laser light for marking.

In this embodiment, rod-shaped Nd:YVO$_4$ (yttrium vanadate) is used as laser media constituting the solid-state laser crystal 31. Laser excitation light is incident from one end surface of the rod-shaped solid-state laser crystal 31, and laser light having a fundamental wavelength (so-called fundamental wave) is emitted from the other end surface (so-called unidirectional excitation scheme by end pumping). In this embodiment, the fundamental wavelength is set to 1064 nm. On the other hand, a wavelength of the excitation light is set to the vicinity of a center wavelength of an absorption spectrum of Nd:YVO$_4$ in order to promote stimulated emission. However, rare earth-doped YAG, YLF, GdVO$_4$, and the like, for example, can be used as other laser media without being limited to this example.

In addition, the non-linear optical crystal 32 according to this embodiment is configured by combining a first wavelength conversion element (not illustrated) that generates a second harmonic wave having a wavelength higher than the wavelength (fundamental wavelength) of the fundamental wave and a second wavelength conversion element (not illustrated) that generates a third harmonic wave having a higher wavelength than the second harmonic wave.

The second harmonic wave is obtained by doubling a frequency of the fundamental wave. The wavelength of the second harmonic wave is set to 532 nm in this embodiment. The third harmonic wave is obtained by tripling the frequency of the fundamental wave. A wavelength of the third harmonic wave is set to 355 nm in this embodiment, and is set to fall within the ultraviolet range.

In this embodiment, LBO (LiB$_3$O$_5$) is used as the first wavelength conversion element and the second wavelength conversion element. However, not limited to LBO (LiB$_3$O$_5$), various organic non-linear optical materials, inorganic non-linear optical materials, and the like can be used as the first wavelength conversion element and/or the second wavelength conversion element.

(Laser Light Scanning Section 4)

The laser light scanning section 4 is configured using a so-called biaxial (X-axis and Y-axis) galvano scanner, and includes a first scanner 41 as a Y scanner and a second scanner 42 as an X scanner.

The first scanner 41 includes a first mirror 41a that reflects the UV laser light generated by the laser light output section 3. The second scanner 42 includes a second mirror 42a that reflects the UV laser light reflected by the first mirror 41a.

The laser light scanning section 4 drives the first mirror 41a and the second mirror 42a in accordance with print data created in advance, thereby polarizing the UV laser light generated by the laser light output section 3 so as to be emitted toward the irradiation area R1. The UV laser light deflected in this manner passes through the exit window 6 and is emitted to the irradiation area R1.

<Marker Controller 100>

Figure 4:
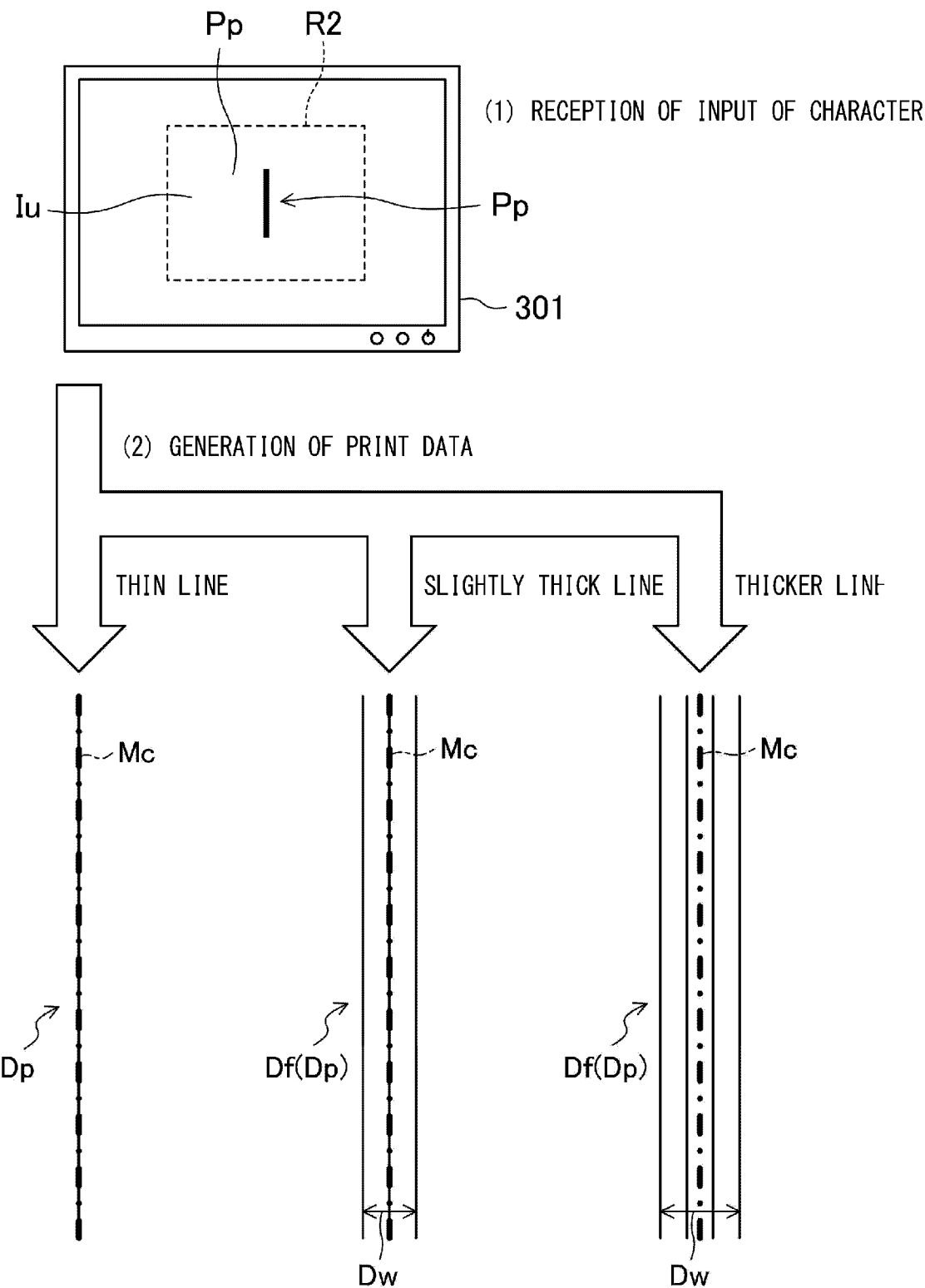
FIG. 4 is a diagram for describing print data for boldface.
Figure 5:
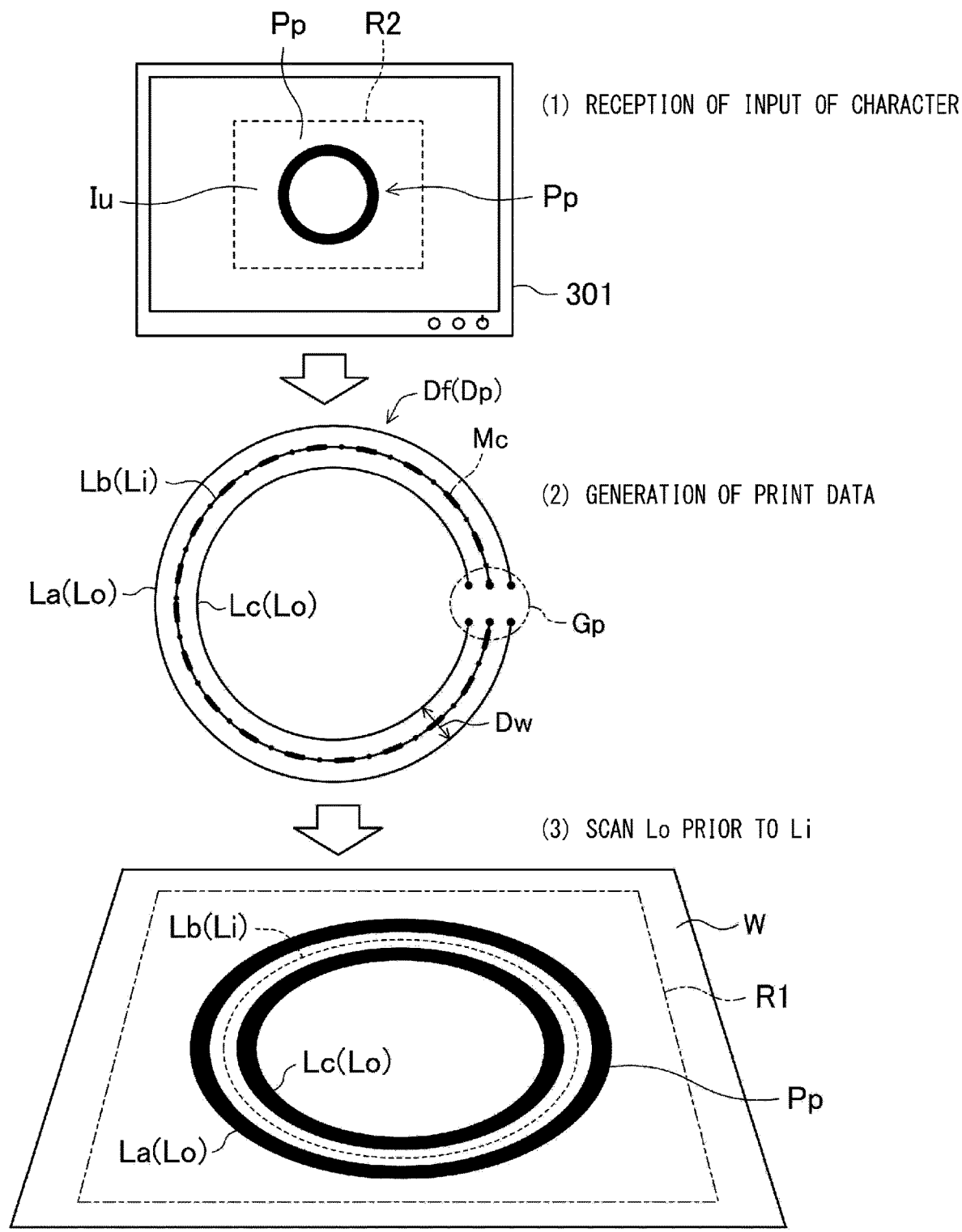
FIG. 5 is a diagram for describing a basic concept of a scan order according to this embodiment.

FIG. 4 is a diagram for describing print data for boldface Df. FIG. 5 is a diagram for describing a basic concept of a scan order according to this embodiment. As illustrated in FIG. 2, the marker controller 100 includes a reception section 101 that receives the setting of the printing conditions; the storage section 102 that stores the printing condition; a print data generation section 103 that generates print data Dp based on the print pattern Pp included in the printing conditions; a marking control section 104 that controls the marker head 1 based on the print data Dp; and a power supply section 105 that supplies electric power to the marker head 1.

Note that one or more of these elements may be provided in the operation terminal 300 (print setting apparatus) or the marker head 1. For example, the print data generation section 103 may be mounted in the operation terminal 300, or the power supply section 105 may be provided in the marker head 1.

(Reception Section 101)

The reception section 101 is configured to receive the printing conditions set through the operation terminal 300 and output the received printing conditions to the storage section 102 and/or the print data generation section 103.

Specifically, the reception section 101 according to this embodiment is electrically connected to the operation terminal 300, displays the setting plane R2 on the display section 301 as the display unit, and arranges the input interface Iu as the character input unit on the setting plane R2.

The reception section 101 can reflect a content input through the input interface Iu in each of the printing conditions and output the printing condition after reflection to the storage section 102 and/or the marking control section 104.

(Storage Section 102)

The storage section 102 is configured to temporarily or continuously store the printing conditions received by the reception section 101, and output the stored printing conditions to the print data generation section 103, the marking control section 104, the display section 301, or the like if necessary.

Specifically, the storage section 102 according to this embodiment includes, for example, a non-volatile memory such as a hard disk drive (HDD) or a solid state drive (SSD), or a volatile memory, and can temporarily or continuously store data indicating print settings.

(Print Data Generation Section 103)

The print data generation section 103 generates the print data Dp in association with the setting plane R2 defined by the orthogonal coordinates based on the print pattern Pp received by the input interface Iu as the character input unit. The print data Dp is data having a scanning line along a line element of a character that needs to be marked. In a case where the character is made bold, the print data Dp can be called "bold print data". The print data Dp as the bold print data Df includes a plurality of scanning lines arranged side by side in a direction in which the line element becomes thick.

Specifically, the print data generation section 103 according to this embodiment generates the print data Dp in which the plurality of scanning lines are arranged side by side in a character width direction that is a direction orthogonal to a scanning direction of the print pattern Pp such that the print pattern Pp is made bold in accordance with a character size of the print pattern Pp whose input is received by the input interface Iu. The "character width direction" in this specification merely means a direction orthogonal to each of the scanning lines, and may be various directions in each portion of the scanning line, such as a left-right direction, a vertical direction, and an oblique direction. The "character width direction" mentioned herein does not mean a specific direction such as an arrangement direction of characters in each document or a direction orthogonal to the arrangement direction. In other words, the direction orthogonal to a scanning direction of the print pattern Pp can be said to be an example of a direction orthogonal to each center line of the line element forming the character corresponding to the print pattern Dp, and a direction in which the line element of the character becomes thick.

Note that the scanning line referred to herein indicates a trajectory of an irradiation position of UV laser light on the surface (particularly, the surface in the irradiation area R1) of the workpiece W. This scanning line is set so as to correspond to the print pattern Pp, and a shape of the scanning line changes in accordance with the print pattern Pp, and the number of scanning lines changes in accordance with a form and thickness of the character of the print pattern Pp. The print data Dp according to this embodiment includes data indicating the number of scanning lines and the shape of each of the scanning lines.

For example, in a case where a lower-case letter "l" made as thin as possible is set as the print pattern Pp as illustrated in the left diagram of FIG. 4, the number of scanning lines is one, and a shape of the scanning line is a vertical line. In this case, a scanning direction of the print pattern Pp is a direction (vertical direction in the plane of drawing) in which the scanning line extends.

On the other hand, in a case where a lower case letter "l" thickened to some extent is set as the print pattern Pp as illustrated in the center diagram of FIG. 4, the number of scanning lines is, for example, an odd number, and a shape of each of the scanning lines is a vertical line. In this case, the odd number of scanning lines extend substantially parallel to each other. In addition, the middle one out of the odd number of scanning lines substantially coincides with a center line (hereinafter, also simply referred to as the "center line of the character") Mc of the line element of the character. In this case, a scanning direction of the print pattern Pp is a direction (vertical direction in the plane of the drawing) in which the scanning lines extend, and a character width direction, which is an arrangement direction of the scanning lines, is a direction (horizontal direction in the plane of drawing) orthogonal to the direction in which the scanning lines extend.

Alternatively, the number of scanning lines may be an even number as illustrated in the right diagram of FIG. 4. In this case, the center line Mc of the character extends between two scanning lines at the center of the even number of scanning lines. As illustrated in the right diagram of FIG. 4, the center line Mc does not necessarily coincide with the scanning line.

Hereinafter, among pieces of the print data Dp, the print data Dp corresponding to the print pattern Pp made bold, that is, the print data Dp in which the number of scanning lines is plural may be referred to as "print data for boldface", and a reference sign "Df" may be added thereto. Hereinafter, a case where the print data for boldface Df is generated as the print data Dp will be described.

The print data for boldface Df generated by the print data generation section 103 is stored in the storage section 102 or directly input to the marking control section 104.

(Marking Control Section 104)

The marking control section 104 is configured to perform marking using UV laser light on the workpiece W arranged on the irradiation area R1 as the print surface by controlling the laser light output section 3 and the laser light scanning section 4 based on the print data Dp generated by the print data generation section 103.

For example, when the print data for boldface Df is generated as the print data Dp, the marking control section 104 reads the number of scanning lines forming the print data for boldface Df and a shape of each of the scanning lines. Further, the plurality of scanning lines are sequentially scanned one by one on the print surface according to a predetermined scan order (order of scanning each of the scanning lines).

In general, among the plurality of scanning lines forming the print data for boldface Df, scanning lines adjacent to each other in a direction (character width direction Dw) in which the above-described line element becomes thick can be divided into an inner scanning line (hereinafter, referred to as the "inner scanning line") Li relatively close to the center line Mc of the character (or substantially coincides with the center line Mc) and an outer scanning line (hereinafter, referred to as the "outer scanning line") Lo relatively farther from the center line Mc than the inner scanning line Li. In this embodiment, the character width direction Dw is defined as a direction orthogonal to the center line Mc.

Here, considered is a case where a lower case "o" is input as the print pattern Pp, and a first scanning line La that has a circular shape, a second scanning line Lb that has a circular shape having a smaller diameter than first scanning line La, and a third scanning line Lc that has a circular shape having a smaller diameter than second scanning line Lb are set as the print data for boldface Df corresponding to the print pattern Pp as illustrated in FIG. 5.

The first scanning line La forms an outer contour of the character, the second scanning line Lb extends along the center line Mc of the character, and the third scanning line Lc forms an inner contour of the character. In addition, the circular shapes of the first scanning line La, the second scanning line Lb, and the third scanning line Lc are closed curves. In this manner, the plurality of scanning lines forming the print data for boldface Df may include the scanning line forming the contour (inner contour or outer contour) of the character, may include the scanning line extending along the center line of the character, or may include the closed curve such as the circular shape.

In this case, among the first scanning line La, the second scanning line Lb, and the third scanning line Lc, the first scanning line La and the second scanning line Lb are adjacent to each other, and the second scanning line Lb and the third scanning line Lc are adjacent to each other.

Regarding the pair of the first scanning line La and the second scanning line Lb between the two pairs, the first scanning line La corresponds to the outer scanning line Lo, and the second scanning line Lb corresponds to the inner scanning line Li. In addition, regarding the pair of the second scanning line Lb and the third scanning line Lc, the second scanning line Lb corresponds to the inner scanning line Li, and the third scanning line Lc corresponds to the outer scanning line Lo.

Note that the distribution of the outer scanning line Lo and the inner scanning line Li changes in accordance with the number of scanning lines and details of a pair. For example, in a case where a fourth scanning line (not illustrated) exists further outside the first scanning line La, regarding a pair of the fourth scanning line and the first scanning line La, the fourth scanning line corresponds to the outer scanning line Lo, and the first scanning line La corresponds to the inner scanning line Li.

Further, for each pair of scanning lines adjacent in the character width direction Dw among the plurality of scanning lines forming the print data for boldface Df, the marking control section 104 according to this embodiment controls the laser light scanning section 4 so as to scan UV laser light along the outer scanning line Lo earlier than the inner scanning line Li.

In the example illustrated in FIG. 5, the marking control section 104 scans UV laser light along one of the first scanning line La and the third scanning line Lc, and then, scans UV laser light along the other of the first scanning line La and the third scanning line Lc. Thereafter, the marking control section 104 scans UV laser light along the remaining second scanning line Lb.

Such a scan order may be determined by the print data generation section 103 when generating the print data for boldface Df, and may be stored in the storage section 102 or the like in association with the print data for boldface Df or as an element of the print data for boldface Df. Alternatively, the marking control section 104 may determine the scan order each time when scanning UV laser light.

In addition, the marking control section 104 according to this embodiment controls the laser light scanning section 4 to scan UV laser light in order from the scanning line forming the contour of the character corresponding to the print data for boldface Df among the plurality of scanning lines forming the print data for boldface Df.

Specifically, in the example illustrated in FIG. 5, the UV laser light is scanned sequentially from the first scanning line La and the third scanning line Lc as the scanning lines forming the contour of the character. Instead of this, considered is a case where a fourth scanning line (not illustrated) that coincides with an outer contour of a character exists further outside the first scanning line La, for example, when the first scanning line La is located slightly inside the outer contour of the character and the third scanning line Lc is located slightly inside an inner contour of the character.

In this case, the marking control section 104 scans the UV laser light in order from the fourth scanning line that coincides with the outer contour prior to the first scanning line La and the third scanning line Lc. The same applies to a case where a fifth scanning line (not illustrated) that coincides with the inner contour of the character exists further inside the third scanning line Lc. In this case, the marking control section 104 scans the UV laser light in order from the fifth scanning line that coincides with the inner contour prior to the first scanning line La and the third scanning line Lc.

In addition, in a case where a closed curve is included in a plurality of scanning lines and UV laser light is scanned along the closed curve, the marking control section 104 controls the laser light scanning section 4 so as to provide a gap between a start point and an end point of the closed curve.

Specifically, the circular first scanning line La, the circular second scanning line Lb, and the circular third scanning line Lc correspond to the closed curves in the example illustrated in FIG. 5. In this case, a gap Gp is provided between a start point and an end point of a circle corresponding to the first scanning line La. Note that the gap is provided between the start point and the end point of the closed curve here, but this gap is not necessarily provided. In addition, a width of the gap Gp can also be adjusted by adjusting ON and OFF of the UV laser light.

In addition, the marking control section 104 controls the laser light scanning section 4 such that a portion forming an end of a character is divided in each of a plurality of scanning lines forming the print data for boldface Df.

For example, in the case of the lower case "o" illustrated in FIG. 5, it is practically difficult to define an end of the character. However, in the case of the lower case "l" illustrated in FIG. 4, an upper end and a lower end of "l" correspond to the end of the character.

Further, the marking control section 104 according to this embodiment disconnects portions corresponding to the upper end and the lower end of "l" for each of the plurality of scanning lines. In other words, both the upper end and the lower end of "l" are not written by one stroke but are constituted by two or more scanning lines. Such a configuration will be described with reference to Example 2-3 and Example 2-4 which will be described later.

In addition, the marking control section 104 according to this embodiment can also be configured to control the laser light scanning section 4 so as to scan UV laser light in an order in which a scanning line forming a contour of a character is prioritized over the other scanning lines among a plurality of scanning lines forming the print data for boldface Df.

Here, in a case where a character that needs to be marked, such as a numeral "0", has an outer contour and an inner contour, it is preferable that the marking control section 104 scan a scanning line forming one of the outer contour and the inner contour firstly, and scan a scanning line forming the other of the outer contour and the inner contour secondly.

On the other hand, in a case where a character that needs to be marked, such as a numeral "1", has only an outer contour, it is preferable that the marking control section 104 scan a scanning line forming the outer contour firstly. Scanning lines forming the outer contour may be scanned secondly and subsequently.

In addition, the marking control section 104 may control the laser light output section 3 such that second and subsequent intersection points are processed as invalid portions in a case where some of a plurality of scanning lines forming the print data for boldface intersects, and minute laser light is output as compared with that for a non-invalid portion when the invalid portion is scanned with the laser light by the laser light scanning section 4. Note that the term "minute laser light" referred to herein indicates laser light having relatively small laser power.

In addition, when the workpiece W moves, movement information of the workpiece is input (through the user's input or automatically). Examples thereof include a movement speed of the workpiece, a movement direction of the workpiece, an encoder input pulse, and the like. Alternatively, a trigger for specifying a print timing, a trigger delay for delaying the print timing, and the like may be included. The marking control section 104 may control the laser light scanning section 4 such that a plurality of scanning lines forming the print data for boldface follow the movement of the workpiece based on at least the movement speed and the movement direction specified by the movement information of the workpiece.

Hereinafter, specific examples of the scan order, the gap Gp, and the like for various print patterns Pp will be described.

Figure 6A:
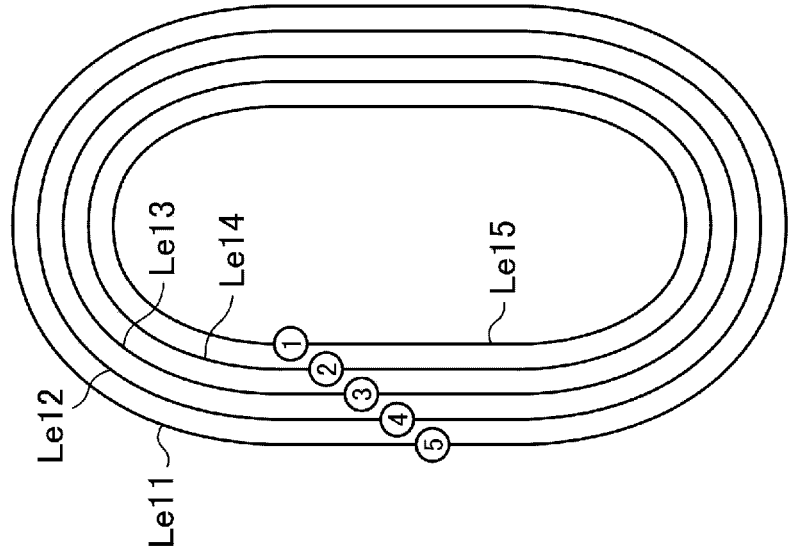
FIGS. 6A and 6B are diagrams illustrating a first comparative example of the scan order.
Figure 6B:
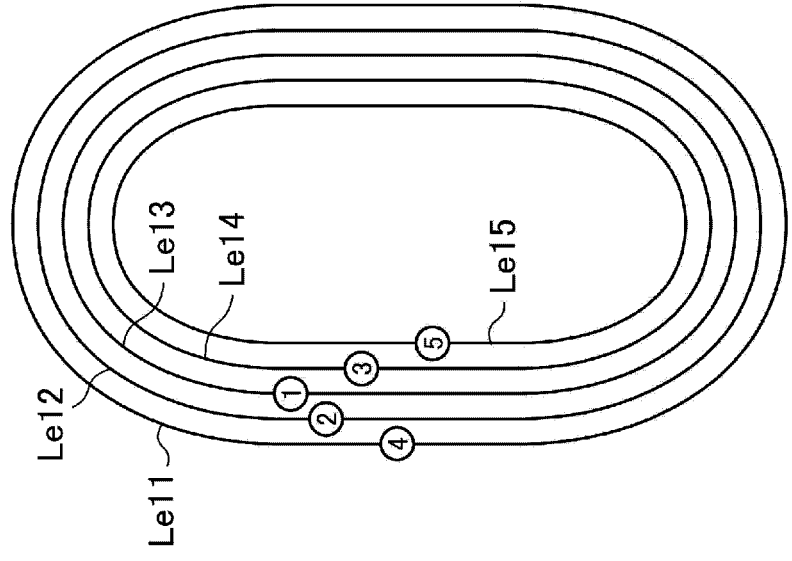

—First Comparative Example and First Example of Scan Order—FIGS. 6A and 6B are diagrams illustrating a first comparative example of the scan order. FIGS. 7A and 7B are diagrams illustrating a first example of the scan order. Here, a case where a numeral "0" is input as the print pattern Pp and five scanning lines arranged side by side in the character width direction Dw are set as the print data for boldface Df corresponding to the print pattern Pp is considered.

The five scanning lines can be referred to as a first scanning line Le11, a second scanning line Le12, a third scanning line Le13, a fourth scanning line Le14, and a fifth scanning line Le15 in order from the scanning line closer to an outer contour of the numeral "0". Among the five scanning lines, the third scanning line Le13 substantially coincides with a center line (not illustrated) of the character, the first scanning line Le11 substantially coincides with the outer contour of the character, and the fifth scanning line Le15 substantially coincides with an inner contour of the character. In addition, the first scanning line Le11 to the fifth scanning line Le15 are all closed curves.

In the case of a conventionally known scan order, scanning is performed in order from a scanning line closer to a center line of a character, or scanning is performed in order from a scanning line closer to an inner contour of a character as illustrated in FIGS. 6A and 6B.

In a case where the former scan order (Comparative Example 1-1) is adopted, the marking control section 104 scans UV laser light in an order of the third scanning line Le13, the second scanning line Le12, the fourth scanning line Le14, the first scanning line Le11, and the fifth scanning line Le15. At this time, scan orders of the second scanning line Le12 and the fourth scanning line Le14 can be replaced with each other, and scan orders of the first scanning line Le11 and the fifth scanning line Le15 can be replaced with each other.

In a case where the latter scan order (Comparative Example 1-2) is adopted, the marking control section 104 scans UV laser light in an order of the fifth scanning line Le15, the fourth scanning line Le14, the third scanning line Le13, the second scanning line Le12, and the first scanning line Le11.

On the other hand, in the case of the scan order according to this embodiment, the first scanning line Le11 is scanned first in a pair of the first scanning line Le11 and the second scanning line Le12, the second scanning line Le12 is scanned first in a pair of the second scanning line Le12 and the third scanning line Le13, the fourth scanning line Le14 is scanned first in a pair of the third scanning line Le13 and the fourth scanning line Le14, and the fifth scanning line Le15 is scanned first in a pair of the fourth scanning line Le14 and the fifth scanning line Le15.

In a case where an example (Example 1-1) of the scan order according to this embodiment is adopted, the marking control section 104 scans UV laser light in an order of the first scanning line Le11, the fifth scanning line Le15, the second scanning line Le12, the fourth scanning line Le14, and the third scanning line Le13.

In addition, in a case where another example (Example 1-2) of the scan order according to this embodiment is adopted, the marking control section 104 scans UV laser light in an order of the first scanning line Le11, the second scanning line Le12, the fifth scanning line Le15, the fourth scanning line Le14, and the third scanning line Le13. In addition, since all the first scanning line Le11 to the fifth scanning line Le15 are the closed curves, the gap Gp is provided between start points and end points of the first scanning line Le11 to the fifth scanning line Le15 in Example 1-2.

Any scan order can be adopted as long as the order satisfies the above-described priority order in each pair without being limited to the examples of Example 1-1 and Example 1-2.

—Second Comparative Example and Second Example of Scan Order—

Figure 8:
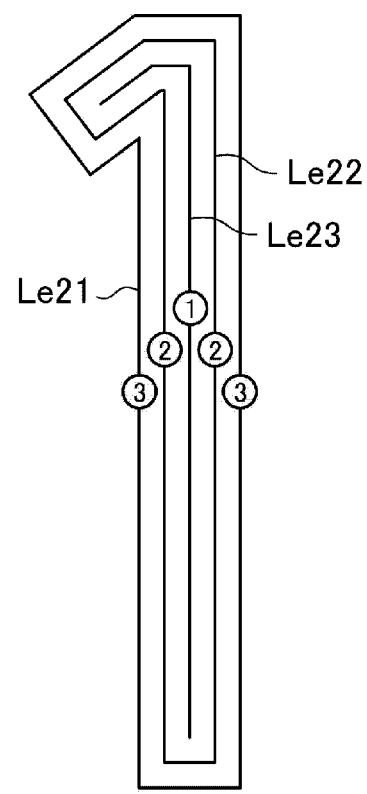
FIG. 8 is a diagram illustrating a second comparative example of the scan order.

FIG. 8 is a diagram illustrating a second comparative example of the scan order. FIG. 9A-9D are diagrams illustrating a second example of the scan order. Here, a case where a numeral "1" is input as the print pattern Pp and three scanning lines arranged side by side in the character width direction Dw are set as the print data for boldface Df corresponding to the print pattern Pp is considered.

The three scanning lines can be referred to as a first scanning line Le21, a second scanning line Le22, and a third scanning line Le23 in order from the scanning line closer to an outer contour of the numeral "1". Among the three scanning lines, the third scanning line Le23 substantially coincides with a center line (not illustrated) of the character, and the third scanning line Le23 coincides with the outer contour of the character. In addition, among the three scanning lines, both the first scanning line Le21 and the second scanning line Le22 are closed curves.

As illustrated in FIG. 9A-9D, in the case of a conventionally known scan order, scanning is performed in order from a scanning line closer to a center line of a character.

In a case where such a scan order (Comparative Example 2) is adopted, the marking control section 104 scans UV laser light in an order of the third scanning line Le23, the second scanning line Le22, and the first scanning line Le21.

On the other hand, in the case of the scan order according to this embodiment, the first scanning line Le21 is scanned first in a pair of the first scanning line Le21 and the second scanning line Le22, and the second scanning line Le22 is scanned first in a pair of the second scanning line Le22 and the third scanning line Le23.

In a case where an example (Example 2-1) of the scan order according to this embodiment is adopted, the marking control section 104 scans UV laser light in an order of the first scanning line Le21, the second scanning line Le22, and the third scanning line Le23.

In a case where another example (Example 2-2) of the scan order according to this embodiment is adopted, the marking control section 104 scans UV laser light in an order of the first scanning line Le21, the third scanning line Le23, and the second scanning line Le22. In this case, the marking control section 104 scans the UV laser light along the first scanning line Le21 that forms the contour of the character more preferentially than the other scanning lines (the second scanning line Le22 and the third scanning line Le23).

In addition, the numeral "1" can define an end of the character, which is different from the numeral "0". As indicated by broken lines in Example 2-3, the first scanning line Le21 and the second scanning line Le22 are each divided into two at an upper end and a lower end of "1".

Therefore, in a case where still another example (Example 2-3) of the scan order according to this embodiment is adopted, the marking control section 104 scans UV laser light in an order of one of the first scanning lines Le21 divided into two lines, the other of the first scanning lines Le21 divided into two lines, one of the second scanning lines Le22 divided into two lines, the other of the second scanning lines Le22 divided into two lines, and the third scanning line Le23.

Note that it is not essential to divide both the first scanning line Le21 and the second scanning line Le22 into two lines, and at least one or more scanning lines may be divided into two lines.

In a case where only the second scanning line Le22 between the first scanning line Le21 and the second scanning line Le22 is divided into two lines, the marking control section 104 scans UV laser light in an order of the first scanning line Le21, one of the second scanning lines Le22 divided into two lines, the other of the second scanning lines Le22 divided into two lines, and the third scanning line Le23 as indicated by broken lines in even still another example of the scan order (Example 2-4).

—Third Example of Scan Order—

Figure 10A:
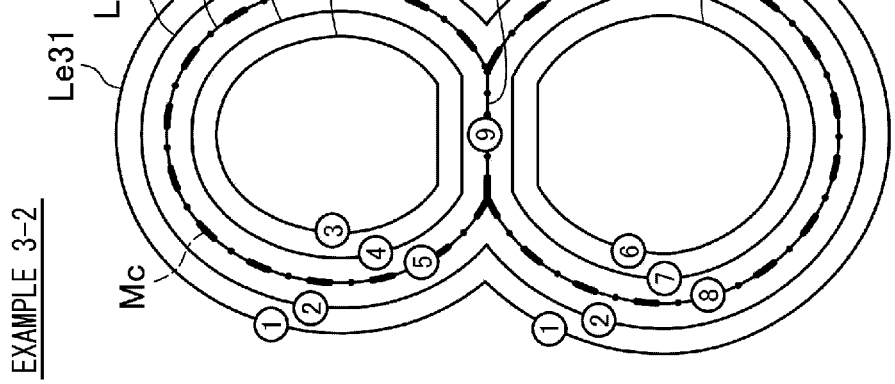
FIGS. 10A and 10B are diagrams illustrating a third example of the scan order.
Figure 10B:
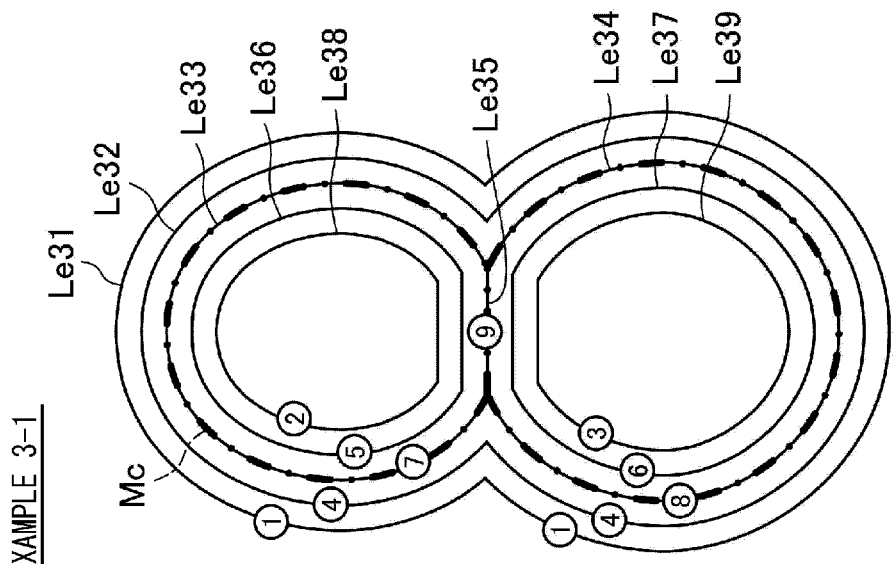

FIGS. 10A and 10B are diagrams illustrating a third example of the scan order. Here, a case where a numeral "8" is input as the print pattern Pp and nine scanning lines are set as the print data for boldface Df corresponding to the print pattern Pp is considered.

The nine scanning lines can be referred to as a first scanning line Le31, a second scanning line Le32, a third scanning line Le33, a fourth scanning line Le34, a fifth scanning line Le35, a sixth scanning line Le36, a seventh scanning line Le37, an eighth scanning line Le38, and a ninth scanning line Le39 in order from the scanning line closer to an outer contour of the numeral "8".

Among the nine scanning lines, the first scanning line Le31 and the second scanning line Le32 are common in an upper half and a lower half of the numeral "8". The third scanning line Le33, the sixth scanning line Le36, and the eighth scanning line Le38 constitute the upper half of the numeral "8". The fourth scanning line Le34, the seventh scanning line Le37, and the ninth scanning line Le39 constitute the lower half of the numeral "8". In addition, the fifth scanning line Le35 is a scanning line that connects the third scanning line Le33 in the upper half and the fourth scanning line Le34 in the lower half.

In addition, among the nine scanning lines, the third scanning line Le33, the fourth scanning line Le34, and the fifth scanning line Le35 substantially coincide with the center line Mc of a character, the first scanning line Le31 substantially coincides with the outer contour of the character, the eighth scanning line Le38 substantially coincides with an inner contour of the upper half, and the ninth scanning line Le39 substantially coincides with an inner contour of the lower half. In addition, the scanning lines other than the third scanning line Le33, the fourth scanning line Le34, and the fifth scanning line Le35 are closed curves.

In the case of the scan order according to this embodiment, the first scanning line Le31 is scanned first in a pair of the first scanning line Le31 and the second scanning line Le32, the second scanning line Le32 is scanned first in a pair of the second scanning line Le32 and the third scanning line Le33, the second scanning line Le32 is scanned first in a pair of the second scanning line Le32 and the fourth scanning line Le34, the sixth scanning line Le36 is scanned first in a pair of the third scanning line Le33 and the sixth scanning line Le36, and the seventh scanning line Le37 is scanned first in a pair of the fourth scanning line Le34 and the seventh scanning line Le37.

In addition, the sixth scanning line Le36 is scanned first in a pair of the fifth scanning line Le35 and the sixth scanning line Le36, the seventh scanning line Le37 is scanned first in a pair of the fifth scanning line Le35 and the seventh scanning line Le37, the eighth scanning line Le38 is scanned first in a pair of the sixth scanning line Le36 and the eighth scanning line Le38, and the ninth scanning line Le39 is scanned first in a pair of the seventh scanning line Le37 and the ninth scanning line Le39.

In a case where an example (Example 3-1) of the scan order according to this embodiment is adopted, the marking control section 104 scans UV laser light in an order of the first scanning line Le31, the eighth scanning line Le38, the ninth scanning line Le39, the second scanning line Le32, the sixth scanning line Le36, the seventh scanning line Le37, the third scanning line Le33, the fourth scanning line Le34, and the fifth scanning line Le35.

In addition, in a case where another example (Example 3-2) of the scan order according to this embodiment is adopted, the marking control section 104 scans UV laser light in an order of the first scanning line Le31, the second scanning line Le32, the eighth scanning line Le38, the sixth scanning line Le36, the third scanning line Le33, the ninth scanning line Le39, the seventh scanning line Le37, the fourth scanning line Le34, and the fifth scanning line Le35.

(Power Supply Section 105)

The power supply section 105 supplies a drive current to the excitation light generation section 2 based on a control signal output from the marking control section 104. Although not described in detail, the power supply section 105 determines the drive current based on the target output input from the marking control section 104, and supplies the determined drive current to the excitation light generation section 2 via the electric cable 200. Details of the power supply section 105 are omitted.

<Regarding Main Processing and User Interface of Laser Marking Apparatus L>

Figure 11:
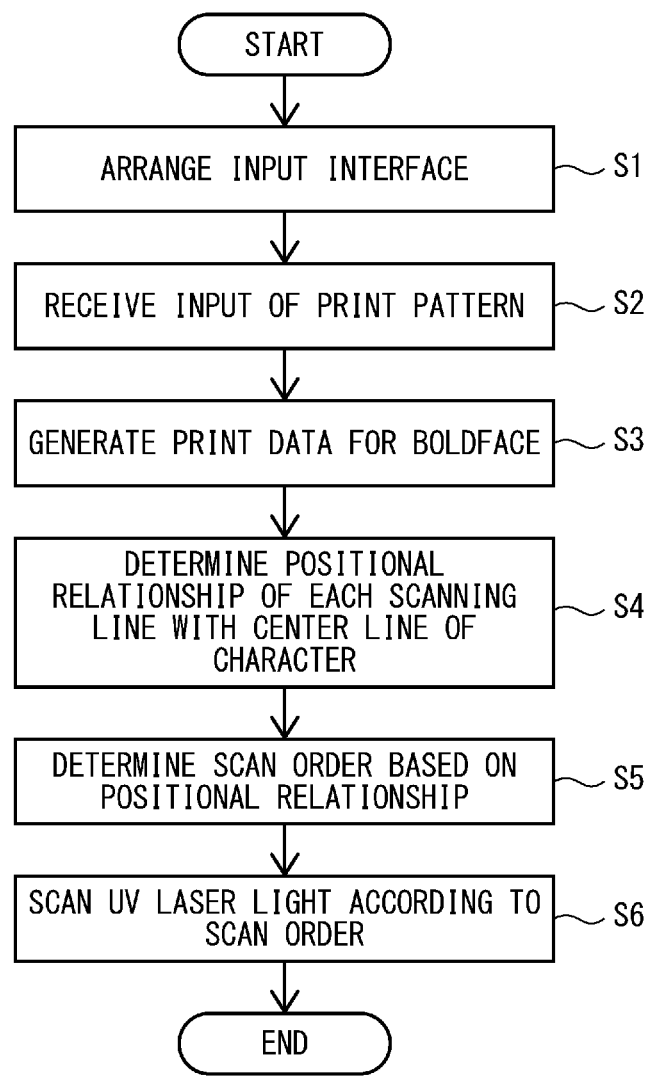
FIG. 11 is a flowchart illustrating a scan order determination procedure.
Figure 12:
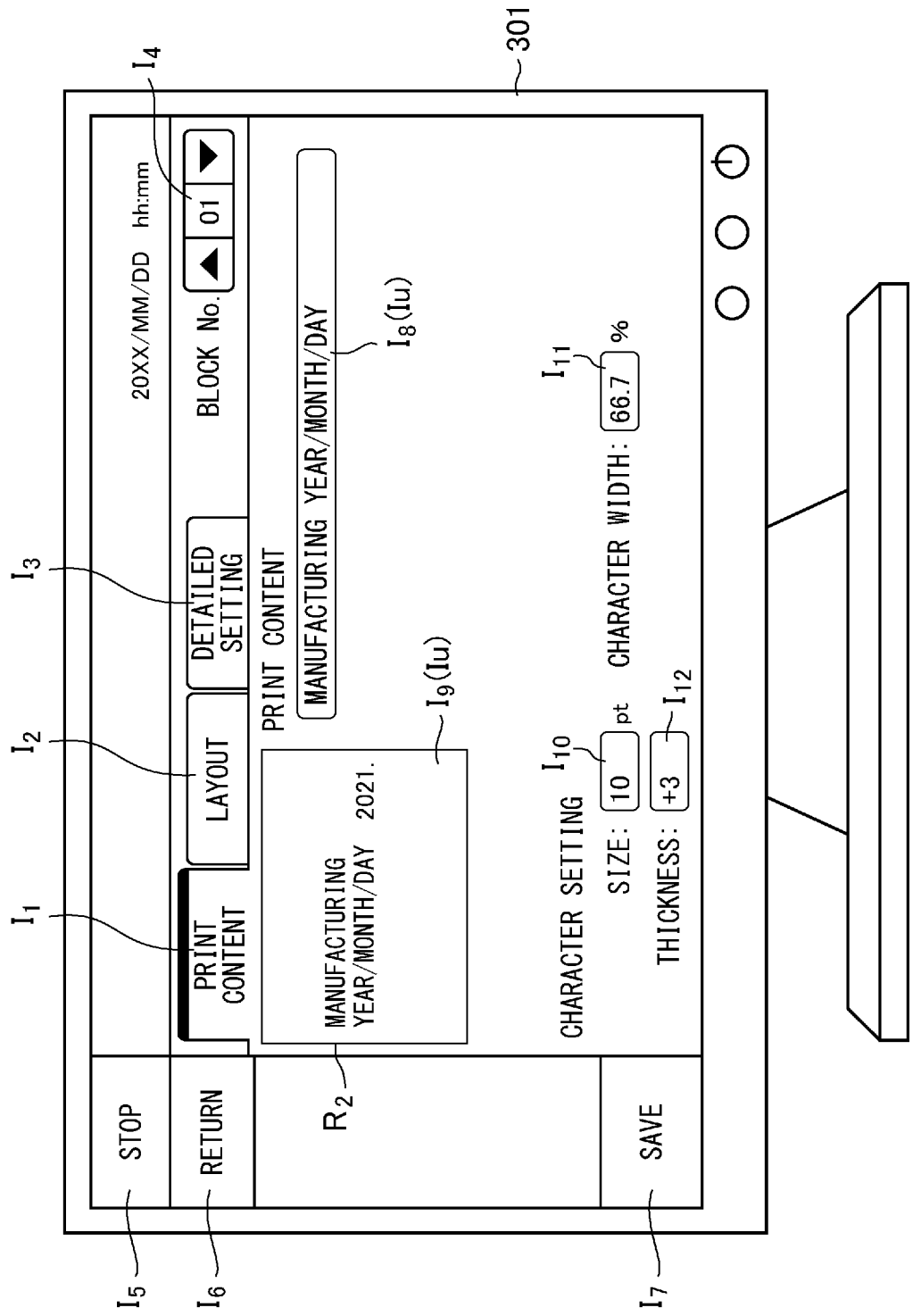
FIG. 12 is a diagram illustrating a user interface according to the scan order.
Figure 13:
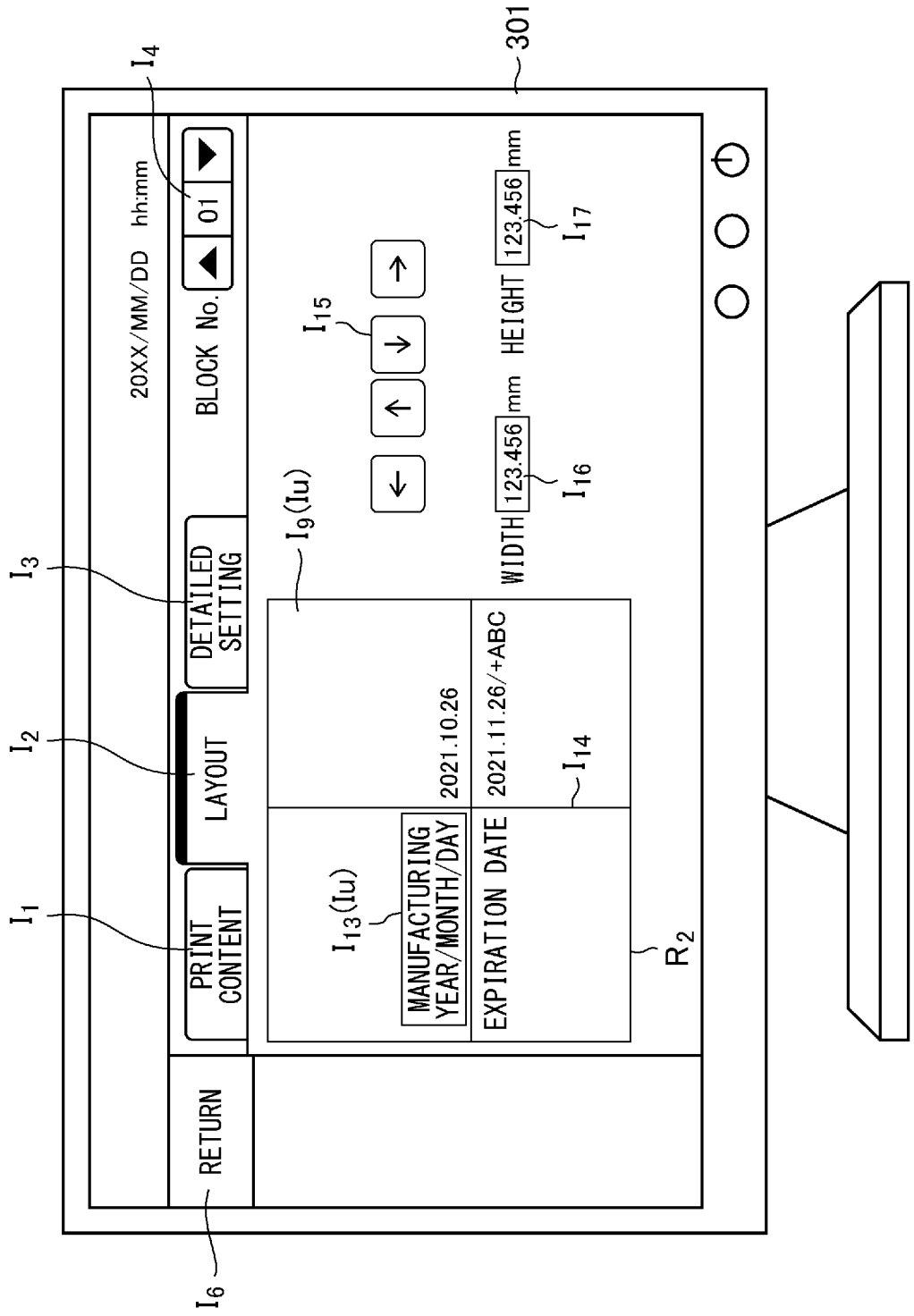
FIG. 13 is a diagram illustrating a user interface according to the scan order.

FIG. 11 is a flowchart illustrating a scan order determination procedure. In addition, FIGS. 12 and 13 are diagrams illustrating user interfaces according to the scan order. Hereinafter, the main processing and user interfaces of the laser marking apparatus L will be described with reference to FIGS. 11 to 13.

First, in step S1 of FIG. 11, the marker controller 100 displays the setting plane R2 on the display section 301, and arranges the input interface Iu that receives an input of the print pattern Pp on the setting plane R2.

In step S1, the display section 301 displays display screens as illustrated in FIGS. 12 and 13, for example. In FIGS. 12 and 13, a first interface $I_1$ is a switching tab for displaying an input screen on which the setting plane R2 is arranged in order to receive an input of a printing content (the print pattern Pp). In addition, a second interface $I_2$ is a switching tab for enlarging and displaying the setting plane R2 in order to receive position adjustment of the print pattern Pp, and a third interface $I_3$ is a switching tab for displaying an input screen on which an input field and the like for inputting detailed settings of the print pattern Pp are arranged. FIG. 12 corresponds to a state in which the first interface $I_1$ is selected, and FIG. 13 corresponds to a state in which the second interface $I_2$ is selected.

In addition, a fourth interface 14 displayed on the upper right of the screen of FIG. 12 is a user interface for displaying an identification number (Block No.) allocated to a print block formed by grouping a plurality of the print patterns Pp and switching the print patterns Pp using the identification number.

In addition, a fifth interface Is displayed on the left side of the screen of FIG. 12 is a button for stopping the operation of the laser marking apparatus L, a sixth interface $I_6$ is a button for transitioning to an input screen of a setting item that needs to be determined at an earlier timing than the print pattern Pp, and a seventh interface $I_7$ is a button for saving a content of the print pattern Pp in the storage section 102 or the like.

In addition, an eighth interface Is displayed from the central portion to the right side of the screen in FIG. 12 is an input field that receives an input of the printing content (print pattern Pp), and constitutes the input interface Iu in this embodiment.

In addition, a ninth interface $I_9$ configured using the setting plane R2 is displayed on the left side of the screen of the eighth interface 18. The ninth interface $I_9$ functions as a display field for displaying the layout of the print pattern Pp, and constitutes the input interface Iu in this embodiment.

In addition, in FIG. 12, a tenth interface $I_{10}$ that receives an input of a character size of the print pattern Pp, an eleventh interface $I_{11}$ that receives an input of a character width of the print pattern Pp, and a twelfth interface $I_{12}$ that receives an input of a thickness of the character constituting the print pattern Pp are displayed on the lower part of the screen of the ninth interface $I_9$.

Meanwhile, in FIG. 13, the ninth interface $I_9$ displayed to be enlarged from the state illustrated in FIG. 12 is displayed. A thirteenth interface $I_{13}$ indicating the print pattern Pp to be subjected to position adjustment and a fourteenth interface $I_{14}$ indicating a crosshair serving as a guideline for position adjustment are displayed in the ninth interface $I_9$ in FIG. 13. The thirteenth interface $I_{13}$ constitutes the input interface Iu in this embodiment.

In addition, in FIG. 13, a fifteenth interface 115 for moving the printing block in the setting plane R2, a sixteenth interface $I_{16}$ for adjusting a width of the entire printing block, and a seventeenth interface $I_{17}$ for adjusting a height of the entire printing block are displayed on the right side of the screen of the ninth interface $I_9$.

Each of the first interface $I_1$ to the seventeenth interface $I_{17}$ is configured to receive an input via the operation section 302.

Subsequently, in step S2 of FIG. 11, the marker controller 100 receives an input of the print pattern Pp via the input interface Iu as illustrated in FIGS. 12 and 13. At this time, the marker controller 100 also receives other settings constituting the print data Dp, such as the thickness of the character.

In subsequent step S3, the print data generation section 103 generates the print data Dp associated with the setting plane R2 based on the print pattern Pp received in step S2. In step S3, the print data generation section 103 generates the print data for boldface Df as the print data Dp according to the settings of the thickness of the character and the like.

In subsequent step S4, as described with reference to FIG. 5, the print data generation section 103 or the marking control section 104 determines a positional relationship of each of the scanning lines with the center line Mc of the character. Specifically, in step S4, the print data generation section 103 or the marking control section 104 classifies adjacent scanning lines among the plurality of scanning lines into the outer scanning line Lo and the inner scanning line Li.

In subsequent step S5, the print data generation section 103 or the marking control section 104 determines a scan order such that the outer scanning line Lo is scanned prior to the inner scanning line Li.

In subsequent step S6, the marking control section 104 scans UV laser light along each of the scanning lines according to the scan order determined in step S5.

As described above, the sheet-like film constituting the workpiece W contains the UV-reactive layer X chemically reacting with the UV laser light. As the workpiece W containing the UV-reactive layer X is scanned with the UV laser light, marking corresponding to the print pattern Pp is applied to the print surface as the irradiation area R1. As printing conditions suitable for such a workpiece W, the laser light output section 3 according to this embodiment adjusts the laser power of the UV laser light within a range of 0.8 W or more and 1.6 W or less. Note that the range of 0.8 W or more and 1.6 W or less is a preferred example, and may be adjusted outside this range.

As an example of the workpiece W containing the UV-reactive layer X, species parameters in the case of marking a general laminate film are shown in Table 1. In Table 1, "No." in the first column indicates a number for identifying each example. In Table 1, Examples A to C and Comparative Examples D to G are exemplified.

In addition, "scanning speed" in the second column indicates a scanning speed of UV laser light; "Frequency" in the third column indicates a Q-switch frequency; "laser power" in the fourth column indicates the laser power of the UV laser light described above; "dot size" in the fifth line indicates a spot diameter of the UV laser light on the surface of the workpiece W; "dot interval" in the sixth line indicates a spot interval of the UV laser light on the surface of the workpiece W; "1-dot power density" in the seventh line indicates the power density of the UV laser light per spot; and "1-line power density" in the eighth column indicates the power density (more specifically, a numerical value obtained by multiplying the 1-dot power density by the number of spots per unit length) of the UV laser light per scanning line. The parameters illustrated in the second to eighth columns are parameters that can be set in advance as the printing conditions described above.

Further, the seventh line indicates the magnitude of damage given to the workpiece W by the UV laser light. "GOOD" indicates that the damage is relatively small, and "BAD" indicates that the damage is relatively large. In addition, the eighth column shows superiority and inferiority of visibility of marking applied to the workpiece W. "GOOD" indicates that the visibility is relatively excellent, and "BAD" indicates that the visibility is relatively poor.

As shown in Table 1, Examples A to C are excellent in both the damage and visibility, and Comparative Examples D to G are poor in either the damage or visibility. Specifically, when the 1-dot power density is high as in Comparative Example D, the damage given to the workpiece W becomes relatively large, and thus, it is preferable to set the 1-dot power density [mW/mm$^2$] to 80 or less.

In addition, when the 1-line power density is high as in Comparative Example E, the damage given to the workpiece W becomes relatively large, and thus, it is preferable to set the 1-line power density [mW/mm] to 510 or less.

In addition, when the 1-dot power density is low as in Comparative Example F, color development becomes thin so that the visibility is poor, and thus, it is preferable to set the 1-dot power density [mW/mm$^2$] to 1.2 or more.

In addition, when the 1-line power density is low as in Comparative Example G, the color development becomes thin so that the visibility is poor, and thus, it is preferable to set the 1-line power density [mW/mm] to 20 or more.

In view of the above, the inventors of this application have found that the 1-dot power density [mW/mm$^2$] is set within a range of 1.2 or more and 80 or less and the 1-line power density [mW/mm] is set within a range of 20 or more and 510 or less as the printing conditions suitable for the workpiece W containing the UV-reactive layer X. As is apparent from Table 1, all the 1-dot power densities and the 1-line power densities according to Examples A to C are set to fall within these ranges.

TABLE 1

| No. | Scanning speed [mm/s] | Frequency [kHz] | Laser power [W] | dot size [μm] | dot interval [μm] | 1-dot power density [mW/mm$^2$] | 1-line power density [mW/mm] | Damage | Visibility |
|---|---|---|---|---|---|---|---|---|---|
| A | 4000 | 40 | 0.6 | 70 | 100 | 3.1 | 31 | GOOD | GOOD |
| B | 3000 | 40 | 2.2 | 40 | 75 | 34 | 458 | GOOD | GOOD |
| C | 4000 | 100 | 1.5 | 70 | 40 | 3.1 | 77 | GOOD | GOOD |
| D | 8000 | 40 | 2 | 25 | 200 | 80 | 400 | BAD | GOOD |
| E | 1000 | 40 | 2.5 | 70 | 25 | 13 | 510 | BAD | GOOD |
| F | 3000 | 100 | 0.6 | 70 | 30 | 1.2 | 41 | GOOD | BAD |
| G | 4000 | 40 | 0.4 | 70 | 100 | 2 | 20 | GOOD | BAD |

<Regarding Improvement in Quality of Boldface Printing>

As described above, the marking control section 104 determines the scan order of each of the scanning lines with the center line Mc of the character as the reference according to this embodiment. Specifically, for two adjacent scanning lines, the outer scanning line Lo farther from the center line Mc is scanned first (see FIG. 5). Accordingly, the scanning line forming the outer contour is scanned in an earlier order as compared with the related art so that higher quality printing can be implemented. As a result, the boldface printing with the sufficient line width can be more easily implemented as compared with the related art.

Furthermore, as illustrated in FIGS. 7, 9, and 10, the marking control section 104 preferentially scans the scanning line forming the outer contour of the character among the plurality of scanning lines forming the print data for boldface Df. Accordingly, it is possible to print the contour of the character with high quality, which is advantageous in easily implementing the boldface printing with a sufficient line width as compared with the related art.

In addition, the laser marking apparatus L according to this embodiment can be configured to be suitable for printing on the film containing the UV-reactive layer X as described with reference to Table 1.

In addition, the marking control section 104 divides the scanning line of the portion corresponding to the end of the character and excludes the portion from an object to be irradiated with the UV laser light as illustrated in FIGS. 6A and 6B. In general, the end of the character is likely to be degenerated, and thus, it is advantageous to improve the quality of boldface printing by excluding such a portion from the object to be irradiated with the UV laser light.

In addition, when the scanning line includes the closed curve forming the inner contour or the like as illustrated in FIG. 5, the marking control section 104 does not directly connect the start point and the end point of the closed curve, but provides the gap Gp therebetween. Accordingly, it is advantageous in terms of suppressing the occurrence of delamination and improving the quality of the boldface printing.

In addition, the marking control section 104 determines the order of scanning each of the scanning lines with the contour of the character as the reference as illustrated in FIG. 9A-9D and the like. Specifically, the scanning line forming the contour of the character, such as the first scanning line Le21 in FIG. 9A-9D, is preferentially scanned over the other scanning lines. Accordingly, the scanning line forming the outer contour is scanned in an earlier order as compared with the related art so that higher quality printing can be implemented. As a result, the boldface printing with the sufficient line width can be more easily implemented as compared with the related art.

OTHER EMBODIMENTS

Although the scan order setting procedure based on the center line Mc of the character has been described with reference to FIG. 11 in the above embodiment, the disclosure is not limited to the flow illustrated in FIG. 11. The scan order can also be set based on a flow illustrated in FIG. 14.

For example, in a case where the numeral "1" as illustrated in FIG. 9A-9D is set as the print pattern Pp and is made bold, scanning lines are added in an order of the second scanning line Le22 and the first scanning line Le21 outward from single-line data (the print data Dp including one scanning line) including only the third scanning line Le23. The marking control section 104 according to the disclosure can set the scan order to be a reverse order of the above addition order of the scanning lines. In this case, the scanning lines are scanned in an order of the first scanning line Le21, the second scanning line Le22, and the third scanning line Le23 in descending order of a scanning timing. This scan order coincides with the scan order illustrated in Example 2-1, and is the scan order in which the scanning line (first scanning line Le21) forming the contour of the character is prioritized.

In addition, for example, in a case where the numeral "0" as illustrated in FIGS. 7A and 7B is set as the print pattern Pp and is made bold, for example, scanning lines are added in an order of the fourth scanning line Le14, the second scanning line Le12, the fifth scanning line Le15, and the first scanning line Le11 from single-line data including only the third scanning line Le13. The marking control section 104 according to the disclosure can set the scan order to be a reverse order of the above addition order of the scanning lines. In this case, the scanning lines are scanned in an order of the first scanning line Le11, the fifth scanning line Le15, the second scanning line Le12, the fourth scanning line Le14, and the third scanning line Le13 in descending order of a scanning timing. This scan order coincides with the scan order illustrated in Example 1-1.

Figure 14:
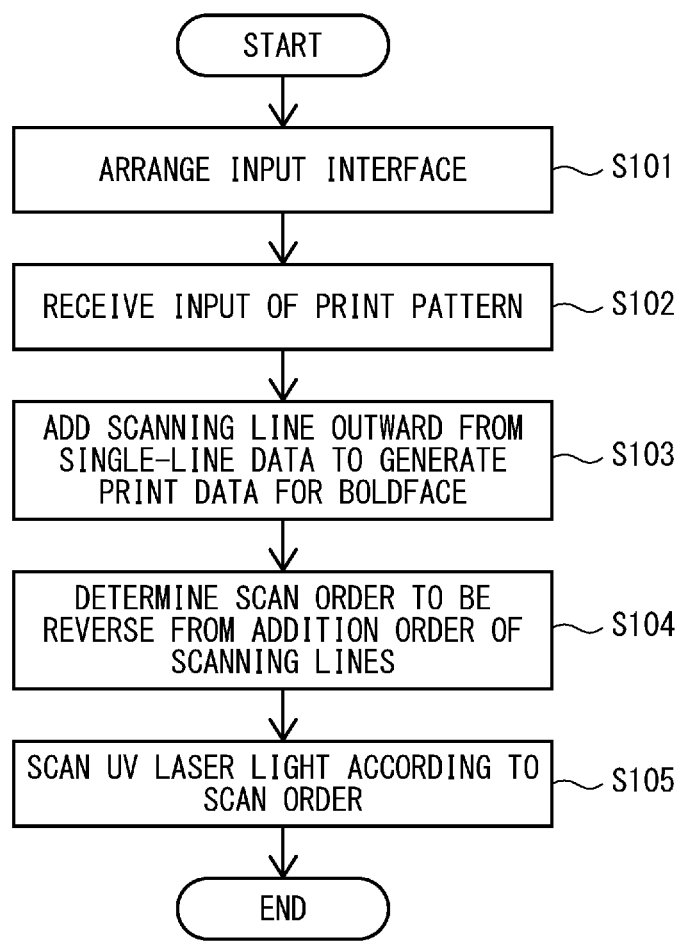
FIG. 14 is a flowchart illustrating another example of a scan order determination procedure.

FIG. 14 is a flowchart illustrating another example of the scan order determination procedure.

First, in step S101 of FIG. 14, the marker controller 100 displays the setting plane R2 on the display section 301, and arranges the input interface Iu that receives an input of the print pattern Pp on the setting plane R2.

Subsequently, in step S102 of FIG. 14, the marker controller 100 receives an input of the print pattern Pp via the input interface Iu as illustrated in FIGS. 12 and 13. At this time, the marker controller 100 also receives other settings constituting the print data Dp, such as the thickness of the character.

In subsequent step S103, the print data generation section 103 generates the print data Dp associated with the setting plane R2 based on the print pattern Pp received in step S102. In step S103, the print data generation section 103 generates the print data for boldface Df by adding a scanning line outward from single-line data according to the setting of the thickness or the like of the character.

In subsequent step S104, the print data generation section 103 or the marking control section 104 determines a scan order so as to be in a reverse order of an addition order of the scanning lines used in step S103 as described with reference to FIG. 5.

In subsequent step S105, the marking control section 104 scans UV laser light along each of the scanning lines according to the scan order determined in step S104. Accordingly, boldface printing with a sufficient line width can be more easily implemented as compared with the related art similarly to the above-described embodiment.

Note that the reception section 101 and the print data generation section 103 may be provided in the operation terminal 300 as the print setting apparatus as described above. In this case, the operation terminal 300 is electrically connected to the laser marker including the marker head 1 and the marker controller 100. In this case, the operation terminal 300 as the print setting apparatus includes a print data transmission section that transmits the print data (print data for boldface) generated by the print data generation section 103 to the laser marker.

What is claimed is:

1. A laser marking apparatus comprising:
a laser light output section that generates laser light based on excitation light and outputs the laser light;
a laser light scanning section that scans a surface of a workpiece with the laser light output from the laser light output section;
a storage section that stores print data for boldface including a plurality of scanning lines arranged side by side in a direction in which a line element becomes thick, the print data including the scanning lines along the line element of a character that needs to be marked; and
a marking control section that controls the laser light output section and the laser light scanning section to mark a character by scanning the laser light along the scanning lines of the print data based on the print data stored in the storage section,
wherein the marking control section controls the laser light scanning section to scan the laser light along an outer scanning line farther from a center line of the line element of the character corresponding to the print data for boldface than an inner scanning line prior to the inner scanning line closer to the center line of the line element of the character corresponding to the print data for boldface, for the scanning lines adjacent to each other in the direction in which the line element becomes thick among the plurality of scanning lines forming the print data for boldface.

2. The laser marking apparatus according to claim 1, further comprising:
a display unit that displays a setting plane defined by an orthogonal coordinate system;
a character input unit that is arranged on the setting plane displayed by the display unit and receives an input of the character that needs to be marked; and
a print data generation section that generates print data for boldface including the plurality of scanning lines arranged side by side in the direction in which the line element of the character input by the character input unit becomes thick,
wherein the storage section stores the print data for boldface generated by the print data generation section.

3. The laser marking apparatus according to claim 1, wherein the direction in which the line element becomes thick is a direction orthogonal to the center line of the line element.

4. The laser marking apparatus according to claim 1, wherein
the laser light output section includes:
a solid-state laser crystal that generates laser light of a fundamental wave based on excitation light; and
a non-linear optical crystal that generates UV laser light based on the laser light of the fundamental wave generated by the solid-state laser crystal, and
the UV laser light generated by the non-linear optical crystal is output as the laser light.

5. The laser marking apparatus according to claim 4, wherein
the plurality of scanning lines forming the print data for boldface include a scanning line forming a contour of the character, and
the marking control section controls the laser light scanning section to scan the UV laser light in order from a scanning line forming an outer contour of the character among the plurality of scanning lines forming the print data for boldface.

6. The laser marking apparatus according to claim 4, wherein
the workpiece is made of a sheet-like multilayer film, and
the multilayer film contains at least a surface layer, a UV-reactive layer that chemically reacts with the UV laser light, and a sealant layer that sandwiches the UV-reactive layer between the surface layer and the sealant layer.

7. The laser marking apparatus according to claim 4, wherein the plurality of scanning lines forming the print data for boldface include a scanning line extending along the center line of the character.

8. The laser marking apparatus according to claim 4, wherein the marking control section controls the laser light scanning section such that a portion forming an end of the character is divided in each of the plurality of scanning lines forming the print data for boldface.

9. The laser marking apparatus according to claim 4, wherein
the plurality of scanning lines forming the print data for boldface include a closed curve, and
the marking control section controls the laser light scanning section to provide a gap between a start point and an end point of the closed curve when the UV laser light is scanned along the closed curve.

10. The laser marking apparatus according to claim 4, wherein the laser light output section adjusts laser power of the UV laser light within a range of 0.8 W or more and 1.6 W or less.

11. The laser marking apparatus according to claim 1, wherein the marking control section controls the laser light scanning section to scan the UV laser light in an order in which a scanning line forming a contour of the character is prioritized over other scanning lines among the plurality of scanning lines forming the print data for boldface.

12. The laser marking apparatus according to claim 1, wherein the marking control section controls the laser light output section such that second and subsequent intersection points are processed as invalid portions in a case where some of the plurality of scanning lines forming the print data for boldface intersect, and minute laser light is output as compared with laser light for a non-invalid portion when the laser light scanning section scans the invalid portion with the laser light.

13. The laser marking apparatus according to claim 1, further comprising a unit that acquires movement information of the workpiece that is moving,
   wherein the marking control section controls the laser light scanning section such that the plurality of scanning lines forming the print data for boldface follow the movement of the workpiece based on a movement speed and a movement direction specified by the movement information of the workpiece.

14. A marking method for marking a character on a surface of a workpiece by using a laser marking apparatus, which includes: a laser light output section that generates laser light based on excitation light and outputs the laser light; a laser light scanning section that scans the surface of the workpiece with the laser light output from the laser light output section; a storage section that stores print data for boldface including a plurality of scanning lines arranged side by side in a direction in which a line element of the character becomes thick, the print data including the scanning lines along the line element of the character that needs to be marked; and a marking control section that controls the laser light output section and the laser light scanning section to mark a character by scanning the laser light along the scanning lines of the print data based on the print data stored in the storage section, the marking method comprising
   controlling the laser light output section and the laser light scanning section by the marking control section to mark the character such that the laser light is scanned along an outer scanning line farther from a center line of the line element of the character corresponding to the print data for boldface than an inner scanning line prior to the inner scanning line closer to the center line of the line element of the character corresponding to the print data for boldface, for the scanning lines adjacent to each other in the direction in which the line element becomes thick among the plurality of scanning lines forming the print data for boldface.

15. A print setting apparatus that is connected to a laser marker, which includes a laser light output section generating and outputting laser light based on excitation light and a laser light scanning section scanning a surface of a workpiece with the laser light output from the laser light output section, and generates print data including a scanning line along a line element of a character that needs to be marked by the laser light scanning section, the print setting apparatus comprising:
   a display unit that displays a setting plane defined by an orthogonal coordinate system;
   a character input unit that is arranged on the setting plane displayed by the display unit and receives an input of the character that needs to be marked;
   a print data generation section that generates print data for boldface including a plurality of the scanning lines arranged side by side in a direction in which the line element of the character input by the character input unit becomes thick; and
   a print data transmission section that transmits the print data for boldface generated by the print data generation section to the laser marker,
   wherein the print data generation section generates the print data for boldface for scanning lines adjacent to each other in the direction in which the line element becomes thick among the plurality of scanning lines forming the print data for boldface in an order in which an outer scanning line farther from the center line than an inner scanning line is scanned prior to the inner scanning line closer to the center line of the line element of the character corresponding to the print data for boldface.

\* \* \* \* \*